(12) United States Patent
Abel Rayan et al.

(10) Patent No.: US 10,717,412 B2
(45) Date of Patent: Jul. 21, 2020

(54) SYSTEM AND METHOD FOR CONTROLLING A VEHICLE USING SECONDARY ACCESS METHODS

(71) Applicant: NIO USA, Inc., San Jose, CA (US)

(72) Inventors: Infantdani Abel Rayan, Santa Clara, CA (US); Karthick Kumar Malli Raghavan, San Jose, CA (US); Xiaochen Jia, Sunnyvale, CA (US)

(73) Assignee: NIO USA, Inc., San Jose, CA (US)

( * ) Notice: Subject to any disclaimer, the term of this patent is extended or adjusted under 35 U.S.C. 154(b) by 164 days.

(21) Appl. No.: 15/810,746

(22) Filed: Nov. 13, 2017

(65) Prior Publication Data

US 2019/0143936 A1    May 16, 2019

(51) Int. Cl.
*B60R 25/24* (2013.01)
*E05B 81/76* (2014.01)
(Continued)

(52) U.S. Cl.
CPC .............. *B60R 25/24* (2013.01); *B60R 25/01* (2013.01); *B60R 25/10* (2013.01);
(Continued)

(58) Field of Classification Search
CPC ......... B60R 25/24; B60R 25/01; B60R 25/10; B60R 25/2045; B60R 25/2054; B60R 25/257; B60R 25/31; B60R 2325/205; E05F 15/76; E05B 81/76; B60J 3/04; B60J 3/08; B60K 23/08; B60K 23/0224; B60N 2/0224; B60S 1/023; B62D 1/181; G05D 1/0011;
(Continued)

(56) References Cited

U.S. PATENT DOCUMENTS 4,361,202 A    11/1982 Minovitch
4,476,954 A    10/1984 Johnson et al.
(Continued)

FOREIGN PATENT DOCUMENTS

CN    1417755    5/2003
CN    1847817    10/2006
(Continued)

OTHER PUBLICATIONS

U.S. Appl. No. 61/567,962, filed Dec. 7, 2011, Baarman et al.
(Continued)

*Primary Examiner* — Sze-Hon Kong
(74) *Attorney, Agent, or Firm* — Sheridan Ross P.C.

(57) ABSTRACT

A message is received that a mobile device is in proximity to a vehicle. For example, a cloud system may receive a message that the mobile device is in proximity to the car of a specific person. Based on the mobile device being in proximity to the vehicle, sensor information is received from one or more sensors on the vehicle. For example, an array of cameras on the vehicle may be used to detect a gesture. The received information from the one or more sensors on the vehicle is processed to identify one or more actions to implement on the vehicle. One or more commands are then sent to implement one or more actions on the vehicle. For example, the one or more commands may be to open a specific door on the vehicle and to turn on a specific heating system in the vehicle.

20 Claims, 6 Drawing Sheets

(51) Int. Cl.
  *B60R 25/10* (2013.01)
  *B60R 25/01* (2013.01)
  *B60R 25/20* (2013.01)
  *B60R 25/31* (2013.01)
  *B60R 25/25* (2013.01)
  *E05F 15/76* (2015.01)
  *B60J 3/04* (2006.01)
  *G05D 1/00* (2006.01)
  *B62D 1/181* (2006.01)
  *B60K 23/08* (2006.01)
  *B60S 1/02* (2006.01)
  *B60N 2/02* (2006.01)

(52) U.S. Cl.
  CPC ...... *B60R 25/2045* (2013.01); *B60R 25/2054* (2013.01); *B60R 25/257* (2013.01); *B60R 25/31* (2013.01); *E05B 81/76* (2013.01); *B60J 3/04* (2013.01); *B60K 23/08* (2013.01); *B60N 2/0224* (2013.01); *B60R 2325/205* (2013.01); *B60S 1/023* (2013.01); *B62D 1/181* (2013.01); *E05F 15/76* (2015.01); *E05Y 2400/66* (2013.01); *E05Y 2400/80* (2013.01); *E05Y 2900/50* (2013.01); *G05D 1/0011* (2013.01)

(58) Field of Classification Search
  CPC ............... H04W 4/046; E05Y 2400/66; E05Y 2400/80; E05Y 2900/50
  See application file for complete search history.

(56) References Cited

U.S. PATENT DOCUMENTS

| | | |
|---|---|---|
| 4,754,255 A | 6/1988 | Sanders et al. |
| 4,875,391 A | 10/1989 | Leising et al. |
| 5,136,498 A | 8/1992 | McLaughlin et al. |
| 5,204,817 A | 4/1993 | Yoshida |
| 5,363,306 A | 11/1994 | Kuwahara et al. |
| 5,508,689 A | 4/1996 | Rado et al. |
| 5,521,815 A | 5/1996 | Rose |
| 5,529,138 A | 6/1996 | Shaw et al. |
| 5,531,122 A | 7/1996 | Chatham et al. |
| 5,572,450 A | 11/1996 | Worthy |
| 5,610,821 A | 3/1997 | Gazis et al. |
| 5,648,769 A | 7/1997 | Sato et al. |
| 5,710,702 A | 1/1998 | Hayashi et al. |
| 5,794,164 A | 8/1998 | Beckert et al. |
| 5,797,134 A | 8/1998 | McMillan et al. |
| 5,812,067 A | 9/1998 | Bergholz et al. |
| 5,825,283 A | 10/1998 | Camhi |
| 5,838,251 A | 11/1998 | Brinkmeyer et al. |
| 5,847,661 A | 12/1998 | Ricci |
| 5,890,080 A | 3/1999 | Coverdill et al. |
| 5,928,294 A | 7/1999 | Zelinkovsky |
| 5,949,345 A | 9/1999 | Beckert et al. |
| 5,983,161 A | 11/1999 | Lemelson et al. |
| 5,986,575 A | 11/1999 | Jones et al. |
| 6,038,426 A | 3/2000 | Williams, Jr. |
| 6,081,756 A | 6/2000 | Mio et al. |
| D429,684 S | 8/2000 | Johnson |
| 6,128,003 A | 10/2000 | Smith et al. |
| 6,141,620 A | 10/2000 | Zyburt et al. |
| 6,148,261 A | 11/2000 | Obradovich et al. |
| 6,152,514 A | 11/2000 | McLellen |
| 6,157,321 A | 12/2000 | Ricci |
| 6,198,996 B1 | 3/2001 | Berstis |
| 6,199,001 B1 | 3/2001 | Ohta et al. |
| 6,202,008 B1 | 3/2001 | Beckert et al. |
| 6,252,544 B1 | 6/2001 | Hoffberg |
| 6,267,428 B1 | 7/2001 | Baldas et al. |
| 6,302,438 B1 | 10/2001 | Stopper, Jr. et al. |
| 6,310,542 B1 | 10/2001 | Gehlot |
| 6,317,058 B1 | 11/2001 | Lemelson et al. |
| 6,339,826 B2 | 1/2002 | Hayes, Jr. et al. |
| 6,356,838 B1 | 3/2002 | Paul |
| 6,388,579 B1 | 5/2002 | Adcox et al. |
| 6,480,224 B1 | 11/2002 | Brown |
| 6,502,022 B1 | 12/2002 | Chastain et al. |
| 6,519,519 B1 | 2/2003 | Stopczynski |
| 6,557,752 B1 | 5/2003 | Yacoob |
| 6,563,910 B2 | 5/2003 | Menard et al. |
| 6,587,739 B1 | 7/2003 | Abrams et al. |
| 6,598,227 B1 | 7/2003 | Berry et al. |
| 6,607,212 B1 | 8/2003 | Reimer et al. |
| 6,617,981 B2 | 9/2003 | Basinger |
| 6,662,077 B2 | 12/2003 | Haag |
| 6,675,081 B2 | 1/2004 | Shuman et al. |
| 6,678,747 B2 | 1/2004 | Goossen et al. |
| 6,681,176 B2 | 1/2004 | Funk et al. |
| 6,690,260 B1 | 2/2004 | Ashihara |
| 6,690,940 B1 | 2/2004 | Brown et al. |
| 6,724,920 B1 | 4/2004 | Berenz et al. |
| 6,754,580 B1 | 6/2004 | Ask et al. |
| 6,757,593 B2 | 6/2004 | Mori et al. |
| 6,762,684 B1 | 7/2004 | Camhi |
| 6,765,495 B1 | 7/2004 | Dunning et al. |
| 6,778,888 B2 | 8/2004 | Cataldo et al. |
| 6,782,240 B1 | 8/2004 | Tabe |
| 6,785,531 B2 | 8/2004 | Lepley et al. |
| 6,816,783 B2 | 11/2004 | Hashima et al. |
| 6,820,259 B1 | 11/2004 | Kawamata et al. |
| 6,944,533 B2 | 9/2005 | Obradovich et al. |
| 6,950,022 B2 | 9/2005 | Breed |
| 6,958,707 B1 | 10/2005 | Siegel |
| 6,992,580 B2 | 1/2006 | Kotzin et al. |
| 7,019,641 B1 | 3/2006 | Lakshmanan et al. |
| 7,020,544 B2 | 3/2006 | Shinada et al. |
| 7,021,691 B1 | 4/2006 | Schmidt et al. |
| 7,042,345 B2 | 5/2006 | Ellis |
| 7,047,129 B2 | 5/2006 | Uotani |
| 7,058,898 B2 | 6/2006 | McWalter et al. |
| 7,096,431 B2 | 8/2006 | Tambata et al. |
| 7,142,696 B1 | 11/2006 | Engelsberg et al. |
| 7,164,117 B2 | 1/2007 | Breed et al. |
| 7,187,947 B1 | 3/2007 | White et al. |
| 7,203,598 B1 | 4/2007 | Whitsell |
| 7,233,861 B2 | 6/2007 | Van Buer et al. |
| 7,239,960 B2 | 7/2007 | Yokota et al. |
| 7,277,454 B2 | 10/2007 | Mocek et al. |
| 7,284,769 B2 | 10/2007 | Breed |
| 7,289,645 B2 | 10/2007 | Yamamoto et al. |
| 7,295,921 B2 | 11/2007 | Spencer et al. |
| 7,313,547 B2 | 12/2007 | Mocek et al. |
| 7,333,012 B1 | 2/2008 | Nguyen |
| 7,343,148 B1 | 3/2008 | O'Neil |
| 7,386,376 B2 | 6/2008 | Basir et al. |
| 7,386,799 B1 | 6/2008 | Clanton et al. |
| 7,432,829 B2 | 10/2008 | Poltorak |
| 7,474,264 B2 | 1/2009 | Bolduc et al. |
| 7,493,140 B2 | 2/2009 | Michmerhuizen et al. |
| 7,526,539 B1 | 4/2009 | Hsu |
| 7,548,815 B2 | 6/2009 | Watkins et al. |
| 7,566,083 B2 | 7/2009 | Vitito |
| 7,606,660 B2 | 10/2009 | Diaz et al. |
| 7,606,867 B1 | 10/2009 | Singhal et al. |
| 7,643,913 B2 | 1/2010 | Taki et al. |
| 7,650,234 B2 | 1/2010 | Obradovich et al. |
| 7,671,764 B2 | 3/2010 | Uyeki et al. |
| 7,680,596 B2 | 3/2010 | Uyeki et al. |
| 7,683,771 B1 | 3/2010 | Loeb |
| 7,711,468 B1 | 5/2010 | Levy |
| 7,734,315 B2 | 6/2010 | Rathus et al. |
| 7,748,021 B2 | 6/2010 | Obradovich et al. |
| RE41,449 E | 7/2010 | Krahnstoever et al. |
| 7,791,499 B2 | 9/2010 | Mohan et al. |
| 7,796,190 B2 | 9/2010 | Basso et al. |
| 7,802,832 B2 | 9/2010 | Camevali |
| 7,821,421 B2 | 10/2010 | Tamir et al. |
| 7,832,762 B2 | 11/2010 | Breed |
| 7,864,073 B2 | 1/2011 | Lee et al. |
| 7,872,591 B2 | 1/2011 | Kane et al. |
| 7,873,471 B2 | 1/2011 | Gieseke |
| 7,881,703 B2 | 2/2011 | Roundtree et al. |

(56) References Cited

U.S. PATENT DOCUMENTS

| | | |
|---|---|---|
| 7,891,004 B1 | 2/2011 | Gelvin et al. |
| 7,891,719 B2 | 2/2011 | Carnevali |
| 7,899,610 B2 | 3/2011 | McClellan |
| 7,966,678 B2 | 6/2011 | Ten Eyck et al. |
| 7,969,290 B2 | 6/2011 | Waeller et al. |
| 7,969,324 B2 | 6/2011 | Chevion et al. |
| 8,060,631 B2 | 11/2011 | Collart et al. |
| 8,064,925 B1 | 11/2011 | Sun et al. |
| 8,066,313 B2 | 11/2011 | Carnevali |
| 8,098,170 B1 | 1/2012 | Szczerba et al. |
| 8,113,564 B2 | 2/2012 | Carnevali |
| 8,131,419 B2 | 3/2012 | Ampunan et al. |
| 8,157,310 B2 | 4/2012 | Carnevali |
| 8,162,368 B2 | 4/2012 | Carnevali |
| 8,175,802 B2 | 5/2012 | Forstall et al. |
| 8,233,919 B2 | 7/2012 | Haag et al. |
| 8,245,609 B1 | 8/2012 | Greenwald et al. |
| 8,306,514 B1 | 11/2012 | Nunally |
| 8,334,847 B2 | 12/2012 | Tomkins |
| 8,346,233 B2 | 1/2013 | Aaron et al. |
| 8,346,432 B2 | 1/2013 | Van Wiemeersch et al. |
| 8,350,721 B2 | 1/2013 | Carr |
| 8,352,282 B2 | 1/2013 | Jensen et al. |
| 8,369,263 B2 | 2/2013 | Dowling et al. |
| 8,417,449 B1 | 4/2013 | Denise |
| 8,432,260 B2 | 4/2013 | Talty et al. |
| 8,442,389 B2 | 5/2013 | Kashima et al. |
| 8,442,758 B1 | 5/2013 | Rovik et al. |
| 8,467,965 B2 | 6/2013 | Chang |
| 8,497,842 B2 | 7/2013 | Tomkins et al. |
| 8,498,809 B2 | 7/2013 | Bill |
| 8,509,982 B2 | 8/2013 | Montemerlo et al. |
| 8,521,410 B2 | 8/2013 | Mizuno et al. |
| 8,527,143 B2 | 9/2013 | Tan |
| 8,527,146 B1 | 9/2013 | Jackson et al. |
| 8,532,574 B2 | 9/2013 | Kirsch |
| 8,543,330 B2 | 9/2013 | Taylor et al. |
| 8,547,340 B2 | 10/2013 | Sizelove et al. |
| 8,548,669 B2 | 10/2013 | Naylor |
| 8,559,183 B1 | 10/2013 | Davis |
| 8,577,600 B1 | 11/2013 | Pierfelice |
| 8,578,279 B2 | 11/2013 | Chen et al. |
| 8,583,292 B2 | 11/2013 | Preston et al. |
| 8,589,073 B2 | 11/2013 | Guha et al. |
| 8,600,611 B2 | 12/2013 | Seize |
| 8,613,385 B1 | 12/2013 | Hulet et al. |
| 8,621,645 B1 | 12/2013 | Spackman |
| 8,624,727 B2 | 1/2014 | Saigh et al. |
| 8,634,984 B2 | 1/2014 | Sumizawa |
| 8,644,165 B2 | 2/2014 | Saarimaki et al. |
| 8,660,735 B2 | 2/2014 | Tengler et al. |
| 8,671,068 B2 | 3/2014 | Harber et al. |
| 8,688,372 B2 | 4/2014 | Bhogal et al. |
| 8,705,527 B1 | 4/2014 | Addepalli et al. |
| 8,706,143 B1 | 4/2014 | Elias |
| 8,718,797 B1 | 5/2014 | Addepalli et al. |
| 8,725,311 B1 | 5/2014 | Breed |
| 8,730,033 B2 | 5/2014 | Yarnold et al. |
| 8,737,986 B2 | 5/2014 | Rhoads et al. |
| 8,761,673 B2 | 6/2014 | Sakata |
| 8,774,842 B2 | 7/2014 | Jones et al. |
| 8,779,947 B2 | 7/2014 | Tengler et al. |
| 8,782,262 B2 | 7/2014 | Collart et al. |
| 8,793,065 B2 | 7/2014 | Seltzer et al. |
| 8,798,918 B2 | 8/2014 | Onishi et al. |
| 8,805,110 B2 | 8/2014 | Rhoads et al. |
| 8,812,171 B2 | 8/2014 | Filev et al. |
| 8,817,761 B2 | 8/2014 | Gruberman et al. |
| 8,825,031 B2 | 9/2014 | Aaron et al. |
| 8,825,277 B2 | 9/2014 | McClellan et al. |
| 8,825,382 B2 | 9/2014 | Liu |
| 8,826,261 B1 | 9/2014 | Anand et al. |
| 8,838,088 B1 | 9/2014 | Henn et al. |
| 8,862,317 B2 | 10/2014 | Shin et al. |
| 8,977,408 B1 | 3/2015 | Cazanas et al. |
| 9,043,016 B2 | 5/2015 | Filippov et al. |
| 9,229,905 B1 | 1/2016 | Penilla et al. |
| 9,646,436 B1 | 5/2017 | Campbell et al. |
| 9,868,449 B1* | 1/2018 | Holz .................. B60W 50/10 |
| 9,952,046 B1* | 4/2018 | Blacutt ............... B60K 28/066 |
| 10,118,548 B1* | 11/2018 | Fields ................ B60Q 5/005 |
| 10,539,959 B1* | 1/2020 | Silver ................ G05D 1/0088 |
| 2001/0010516 A1 | 8/2001 | Roh et al. |
| 2001/0015888 A1 | 8/2001 | Shaler et al. |
| 2002/0009978 A1 | 1/2002 | Dukach et al. |
| 2002/0023010 A1 | 2/2002 | Rittmaster et al. |
| 2002/0026278 A1 | 2/2002 | Feldman et al. |
| 2002/0045484 A1 | 4/2002 | Eck et al. |
| 2002/0065046 A1 | 5/2002 | Mankins et al. |
| 2002/0077985 A1 | 6/2002 | Kobata et al. |
| 2002/0095249 A1 | 7/2002 | Lang |
| 2002/0097145 A1 | 7/2002 | Tumey et al. |
| 2002/0103622 A1 | 8/2002 | Burge |
| 2002/0105968 A1 | 8/2002 | Pruzan et al. |
| 2002/0126876 A1 | 9/2002 | Paul et al. |
| 2002/0128774 A1 | 9/2002 | Takezaki et al. |
| 2002/0143461 A1 | 10/2002 | Burns et al. |
| 2002/0143643 A1 | 10/2002 | Catan |
| 2002/0152010 A1 | 10/2002 | Colmenarez et al. |
| 2002/0154217 A1 | 10/2002 | Ikeda |
| 2002/0169551 A1 | 11/2002 | Inoue et al. |
| 2002/0174021 A1 | 11/2002 | Chu et al. |
| 2003/0004624 A1 | 1/2003 | Wilson et al. |
| 2003/0007227 A1 | 1/2003 | Ogino |
| 2003/0055557 A1 | 3/2003 | Dutta et al. |
| 2003/0060937 A1 | 3/2003 | Shinada et al. |
| 2003/0065432 A1 | 4/2003 | Shuman et al. |
| 2003/0101451 A1 | 5/2003 | Bentolila et al. |
| 2003/0109972 A1 | 6/2003 | Tak |
| 2003/0125846 A1 | 7/2003 | Yu et al. |
| 2003/0132666 A1 | 7/2003 | Bond et al. |
| 2003/0149530 A1 | 8/2003 | Stopczynski |
| 2003/0158638 A1 | 8/2003 | Yakes et al. |
| 2003/0182435 A1 | 9/2003 | Redlich et al. |
| 2003/0202683 A1 | 10/2003 | Ma et al. |
| 2003/0204290 A1 | 10/2003 | Sadler et al. |
| 2003/0230443 A1 | 12/2003 | Cramer et al. |
| 2004/0017292 A1 | 1/2004 | Reese et al. |
| 2004/0024502 A1 | 2/2004 | Squires et al. |
| 2004/0036622 A1 | 2/2004 | Dukach et al. |
| 2004/0039500 A1 | 2/2004 | Amendola et al. |
| 2004/0039504 A1 | 2/2004 | Coffee et al. |
| 2004/0068364 A1 | 4/2004 | Zhao et al. |
| 2004/0070920 A1 | 4/2004 | Flueli |
| 2004/0093155 A1 | 5/2004 | Simonds et al. |
| 2004/0117494 A1 | 6/2004 | Mitchell et al. |
| 2004/0128062 A1 | 7/2004 | Ogino et al. |
| 2004/0153356 A1 | 8/2004 | Lockwood et al. |
| 2004/0162019 A1 | 8/2004 | Horita et al. |
| 2004/0180653 A1 | 9/2004 | Royalty |
| 2004/0182574 A1 | 9/2004 | Adnan et al. |
| 2004/0193347 A1 | 9/2004 | Harumoto et al. |
| 2004/0203974 A1 | 10/2004 | Seibel |
| 2004/0204837 A1 | 10/2004 | Singleton |
| 2004/0209594 A1 | 10/2004 | Naboulsi |
| 2004/0217850 A1 | 11/2004 | Perttunen et al. |
| 2004/0225557 A1 | 11/2004 | Phelan et al. |
| 2004/0255123 A1 | 12/2004 | Noyama et al. |
| 2004/0257208 A1 | 12/2004 | Huang et al. |
| 2004/0260470 A1 | 12/2004 | Rast |
| 2005/0012599 A1 | 1/2005 | DeMatteo |
| 2005/0031100 A1 | 2/2005 | Iggulden et al. |
| 2005/0038598 A1 | 2/2005 | Oesterling et al. |
| 2005/0042999 A1 | 2/2005 | Rappaport |
| 2005/0065678 A1 | 3/2005 | Smith et al. |
| 2005/0065711 A1 | 3/2005 | Dahlgren et al. |
| 2005/0086051 A1 | 4/2005 | Brulle-Drews |
| 2005/0093717 A1 | 5/2005 | Lilja |
| 2005/0097541 A1 | 5/2005 | Holland |
| 2005/0114864 A1 | 5/2005 | Surace |
| 2005/0122235 A1 | 6/2005 | Teffer et al. |
| 2005/0124211 A1 | 6/2005 | Diessner et al. |
| 2005/0130744 A1 | 6/2005 | Eck et al. |
| 2005/0144156 A1 | 6/2005 | Barber |

(56) References Cited

U.S. PATENT DOCUMENTS

| | | |
|---|---|---|
| 2005/0149752 A1 | 7/2005 | Johnson et al. |
| 2005/0153760 A1 | 7/2005 | Varley |
| 2005/0159853 A1 | 7/2005 | Takahashi et al. |
| 2005/0159892 A1 | 7/2005 | Chung |
| 2005/0192727 A1 | 9/2005 | Shostak et al. |
| 2005/0197748 A1 | 9/2005 | Holst et al. |
| 2005/0197767 A1 | 9/2005 | Nortrup |
| 2005/0251324 A1 | 11/2005 | Wiener et al. |
| 2005/0261815 A1 | 11/2005 | Cowelchuk et al. |
| 2005/0278093 A1 | 12/2005 | Kameyama |
| 2005/0283284 A1 | 12/2005 | Grenier et al. |
| 2006/0015819 A1 | 1/2006 | Hawkins et al. |
| 2006/0036358 A1 | 2/2006 | Hale et al. |
| 2006/0044119 A1 | 3/2006 | Egelhaaf |
| 2006/0047386 A1 | 3/2006 | Kanevsky et al. |
| 2006/0058948 A1 | 3/2006 | Blass et al. |
| 2006/0059229 A1 | 3/2006 | Bain et al. |
| 2006/0125631 A1 | 6/2006 | Sharony |
| 2006/0130033 A1 | 6/2006 | Stoffels et al. |
| 2006/0142933 A1 | 6/2006 | Feng |
| 2006/0173841 A1 | 8/2006 | Bill |
| 2006/0175403 A1 | 8/2006 | McConnell et al. |
| 2006/0184319 A1 | 8/2006 | Seick et al. |
| 2006/0212909 A1 | 9/2006 | Girard et al. |
| 2006/0241836 A1 | 10/2006 | Kachouh et al. |
| 2006/0243056 A1 | 11/2006 | Sundermeyer et al. |
| 2006/0250272 A1 | 11/2006 | Puamau |
| 2006/0253307 A1 | 11/2006 | Warren et al. |
| 2006/0259210 A1 | 11/2006 | Tanaka et al. |
| 2006/0274829 A1 | 12/2006 | Siemens et al. |
| 2006/0282204 A1 | 12/2006 | Breed |
| 2006/0287807 A1 | 12/2006 | Teffer |
| 2006/0287865 A1 | 12/2006 | Cross et al. |
| 2006/0288382 A1 | 12/2006 | Vitito |
| 2006/0290516 A1 | 12/2006 | Muehlsteff et al. |
| 2007/0001831 A1 | 1/2007 | Raz et al. |
| 2007/0002032 A1 | 1/2007 | Powers et al. |
| 2007/0010942 A1 | 1/2007 | Bill |
| 2007/0015485 A1 | 1/2007 | DeBiasio et al. |
| 2007/0028370 A1 | 2/2007 | Seng |
| 2007/0032225 A1 | 2/2007 | Konicek et al. |
| 2007/0057781 A1 | 3/2007 | Breed |
| 2007/0061057 A1 | 3/2007 | Huang et al. |
| 2007/0067614 A1 | 3/2007 | Berry et al. |
| 2007/0069880 A1 | 3/2007 | Best et al. |
| 2007/0083298 A1 | 4/2007 | Pierce et al. |
| 2007/0088488 A1 | 4/2007 | Reeves et al. |
| 2007/0103328 A1 | 5/2007 | Lakshmanan et al. |
| 2007/0115101 A1 | 5/2007 | Creekbaum et al. |
| 2007/0118301 A1 | 5/2007 | Andarawis et al. |
| 2007/0120697 A1 | 5/2007 | Ayoub et al. |
| 2007/0135995 A1 | 6/2007 | Kikuchi et al. |
| 2007/0156317 A1 | 7/2007 | Breed |
| 2007/0182625 A1 | 8/2007 | Kerai et al. |
| 2007/0182816 A1 | 8/2007 | Fox |
| 2007/0185969 A1 | 8/2007 | Davis |
| 2007/0192486 A1 | 8/2007 | Wilson et al. |
| 2007/0194902 A1 | 8/2007 | Blanco et al. |
| 2007/0194944 A1 | 8/2007 | Galera et al. |
| 2007/0195997 A1 | 8/2007 | Paul et al. |
| 2007/0200663 A1 | 8/2007 | White et al. |
| 2007/0208860 A1 | 9/2007 | Zellner et al. |
| 2007/0213090 A1 | 9/2007 | Holmberg |
| 2007/0228826 A1 | 10/2007 | Jordan et al. |
| 2007/0233341 A1 | 10/2007 | Logsdon |
| 2007/0250228 A1 | 10/2007 | Reddy et al. |
| 2007/0257815 A1 | 11/2007 | Gunderson et al. |
| 2007/0276596 A1 | 11/2007 | Solomon et al. |
| 2007/0280505 A1 | 12/2007 | Breed |
| 2008/0005974 A1 | 1/2008 | Delgado Vazquez et al. |
| 2008/0023253 A1 | 1/2008 | Prost-Fin et al. |
| 2008/0027337 A1 | 1/2008 | Dugan et al. |
| 2008/0033635 A1 | 2/2008 | Obradovich et al. |
| 2008/0042824 A1 | 2/2008 | Kates |
| 2008/0051957 A1 | 2/2008 | Breed et al. |
| 2008/0052627 A1 | 2/2008 | Oguchi |
| 2008/0071465 A1 | 3/2008 | Chapman et al. |
| 2008/0082237 A1 | 4/2008 | Breed |
| 2008/0086455 A1 | 4/2008 | Meisels et al. |
| 2008/0090522 A1 | 4/2008 | Oyama |
| 2008/0104227 A1 | 5/2008 | Birnie et al. |
| 2008/0119994 A1 | 5/2008 | Kameyama |
| 2008/0129475 A1 | 6/2008 | Breed et al. |
| 2008/0143085 A1 | 6/2008 | Breed et al. |
| 2008/0147280 A1 | 6/2008 | Breed |
| 2008/0148374 A1 | 6/2008 | Spaur et al. |
| 2008/0154712 A1 | 6/2008 | Wellman |
| 2008/0154957 A1 | 6/2008 | Taylor et al. |
| 2008/0161986 A1 | 7/2008 | Breed |
| 2008/0164985 A1 | 7/2008 | Iketani et al. |
| 2008/0169940 A1 | 7/2008 | Lee et al. |
| 2008/0174451 A1 | 7/2008 | Harrington et al. |
| 2008/0212215 A1 | 9/2008 | Schofield et al. |
| 2008/0216067 A1 | 9/2008 | Villing |
| 2008/0228358 A1 | 9/2008 | Wang et al. |
| 2008/0234919 A1 | 9/2008 | Ritter et al. |
| 2008/0252487 A1 | 10/2008 | McClellan et al. |
| 2008/0253613 A1 | 10/2008 | Jones et al. |
| 2008/0255721 A1 | 10/2008 | Yamada |
| 2008/0255722 A1 | 10/2008 | McClellan et al. |
| 2008/0269958 A1 | 10/2008 | Filev et al. |
| 2008/0281508 A1 | 11/2008 | Fu |
| 2008/0300778 A1 | 12/2008 | Kuznetsov |
| 2008/0305780 A1 | 12/2008 | Williams et al. |
| 2008/0319602 A1 | 12/2008 | McClellan et al. |
| 2009/0006525 A1 | 1/2009 | Moore |
| 2009/0024419 A1 | 1/2009 | McClellan et al. |
| 2009/0037719 A1 | 2/2009 | Sakthikumar et al. |
| 2009/0040026 A1 | 2/2009 | Tanaka |
| 2009/0055178 A1 | 2/2009 | Coon |
| 2009/0082951 A1 | 3/2009 | Graessley |
| 2009/0099720 A1 | 4/2009 | Elgali |
| 2009/0112393 A1 | 4/2009 | Maten et al. |
| 2009/0112452 A1 | 4/2009 | Buck et al. |
| 2009/0119657 A1 | 5/2009 | Link, II |
| 2009/0125174 A1 | 5/2009 | Delean |
| 2009/0132294 A1 | 5/2009 | Haines |
| 2009/0138336 A1 | 5/2009 | Ashley et al. |
| 2009/0144622 A1 | 6/2009 | Evans et al. |
| 2009/0157312 A1 | 6/2009 | Black et al. |
| 2009/0158200 A1 | 6/2009 | Palahnuk et al. |
| 2009/0180668 A1 | 7/2009 | Jones et al. |
| 2009/0189373 A1 | 7/2009 | Schramm et al. |
| 2009/0189979 A1 | 7/2009 | Smyth |
| 2009/0193055 A1* | 7/2009 | Kuberka ............... G06F 16/51 |
| 2009/0195370 A1 | 8/2009 | Huffman et al. |
| 2009/0210257 A1 | 8/2009 | Chalfant et al. |
| 2009/0216935 A1 | 8/2009 | Flick |
| 2009/0222200 A1 | 9/2009 | Link et al. |
| 2009/0224931 A1 | 9/2009 | Dietz et al. |
| 2009/0224942 A1 | 9/2009 | Goudy et al. |
| 2009/0234578 A1 | 9/2009 | Newby et al. |
| 2009/0241883 A1 | 10/2009 | Nagoshi et al. |
| 2009/0254446 A1 | 10/2009 | Chernyak |
| 2009/0264849 A1 | 10/2009 | La Croix |
| 2009/0275321 A1 | 11/2009 | Crowe |
| 2009/0278750 A1 | 11/2009 | Man et al. |
| 2009/0278915 A1 | 11/2009 | Kramer et al. |
| 2009/0279839 A1 | 11/2009 | Nakamura et al. |
| 2009/0284359 A1 | 11/2009 | Huang et al. |
| 2009/0287405 A1 | 11/2009 | Liu et al. |
| 2009/0299572 A1 | 12/2009 | Fujikawa et al. |
| 2009/0312998 A1 | 12/2009 | Berckmans et al. |
| 2009/0319181 A1 | 12/2009 | Khosravy et al. |
| 2010/0008053 A1 | 1/2010 | Osternack et al. |
| 2010/0023204 A1 | 1/2010 | Basir et al. |
| 2010/0035620 A1 | 2/2010 | Naden et al. |
| 2010/0036560 A1 | 2/2010 | Wright et al. |
| 2010/0042498 A1 | 2/2010 | Schalk |
| 2010/0052945 A1 | 3/2010 | Breed |
| 2010/0057337 A1 | 3/2010 | Fuchs |
| 2010/0066498 A1 | 3/2010 | Fenton |
| 2010/0069115 A1 | 3/2010 | Liu |
| 2010/0070338 A1 | 3/2010 | Siotia et al. |

(56) References Cited

U.S. PATENT DOCUMENTS

| | | |
|---|---|---|
| 2010/0077094 A1 | 3/2010 | Howarter et al. |
| 2010/0087987 A1 | 4/2010 | Huang et al. |
| 2010/0090817 A1 | 4/2010 | Yamaguchi et al. |
| 2010/0097178 A1 | 4/2010 | Pisz et al. |
| 2010/0097239 A1 | 4/2010 | Campbell et al. |
| 2010/0097458 A1 | 4/2010 | Zhang et al. |
| 2010/0106344 A1 | 4/2010 | Edwards et al. |
| 2010/0106418 A1 | 4/2010 | Kindo et al. |
| 2010/0118025 A1 | 5/2010 | Smith et al. |
| 2010/0121570 A1 | 5/2010 | Tokue et al. |
| 2010/0121645 A1 | 5/2010 | Seitz et al. |
| 2010/0125387 A1 | 5/2010 | Sehyun et al. |
| 2010/0125405 A1 | 5/2010 | Chae et al. |
| 2010/0125811 A1 | 5/2010 | Moore et al. |
| 2010/0127847 A1 | 5/2010 | Evans et al. |
| 2010/0131300 A1 | 5/2010 | Collopy et al. |
| 2010/0134958 A1 | 6/2010 | Disaverio et al. |
| 2010/0136944 A1 | 6/2010 | Taylor et al. |
| 2010/0137037 A1 | 6/2010 | Basir |
| 2010/0144284 A1 | 6/2010 | Chutorash et al. |
| 2010/0145700 A1 | 6/2010 | Kennewick et al. |
| 2010/0145987 A1 | 6/2010 | Harper et al. |
| 2010/0152976 A1 | 6/2010 | White et al. |
| 2010/0169432 A1 | 7/2010 | Santori et al. |
| 2010/0174474 A1 | 7/2010 | Nagase |
| 2010/0179712 A1 | 7/2010 | Pepitone et al. |
| 2010/0185341 A1 | 7/2010 | Wilson et al. |
| 2010/0188831 A1 | 7/2010 | Ortel |
| 2010/0197359 A1 | 8/2010 | Harris |
| 2010/0202346 A1 | 8/2010 | Sitzes et al. |
| 2010/0211259 A1 | 8/2010 | McClellan |
| 2010/0211282 A1 | 8/2010 | Nakata et al. |
| 2010/0211300 A1 | 8/2010 | Jaffe et al. |
| 2010/0211304 A1 | 8/2010 | Hwang et al. |
| 2010/0211441 A1 | 8/2010 | Sprigg et al. |
| 2010/0217458 A1 | 8/2010 | Schweiger et al. |
| 2010/0222939 A1 | 9/2010 | Namburu et al. |
| 2010/0228404 A1 | 9/2010 | Link et al. |
| 2010/0234071 A1 | 9/2010 | Shabtay et al. |
| 2010/0235042 A1 | 9/2010 | Ying |
| 2010/0235744 A1 | 9/2010 | Schultz |
| 2010/0235891 A1 | 9/2010 | Oglesbee et al. |
| 2010/0250071 A1 | 9/2010 | Pala et al. |
| 2010/0253493 A1 | 10/2010 | Szczerba et al. |
| 2010/0256836 A1 | 10/2010 | Mudalige |
| 2010/0265104 A1 | 10/2010 | Zlojutro |
| 2010/0268426 A1 | 10/2010 | Pathak et al. |
| 2010/0274410 A1 | 10/2010 | Tsien et al. |
| 2010/0280751 A1 | 11/2010 | Breed |
| 2010/0287303 A1 | 11/2010 | Smith et al. |
| 2010/0289632 A1 | 11/2010 | Seder et al. |
| 2010/0289643 A1 | 11/2010 | Trundle et al. |
| 2010/0291427 A1 | 11/2010 | Zhou |
| 2010/0295676 A1 | 11/2010 | Khachaturov et al. |
| 2010/0304640 A1 | 12/2010 | Sofman et al. |
| 2010/0305807 A1 | 12/2010 | Basir et al. |
| 2010/0306080 A1 | 12/2010 | Trandal et al. |
| 2010/0306309 A1 | 12/2010 | Santori et al. |
| 2010/0306435 A1 | 12/2010 | Nigoghosian et al. |
| 2010/0315218 A1 | 12/2010 | Cades et al. |
| 2010/0321151 A1 | 12/2010 | Matsuura et al. |
| 2010/0325626 A1 | 12/2010 | Greschler et al. |
| 2010/0332130 A1 | 12/2010 | Shimizu et al. |
| 2011/0015853 A1 | 1/2011 | DeKock et al. |
| 2011/0018736 A1 | 1/2011 | Carr |
| 2011/0021213 A1 | 1/2011 | Carr |
| 2011/0021234 A1 | 1/2011 | Tibbits et al. |
| 2011/0028138 A1 | 2/2011 | Davies-Moore et al. |
| 2011/0035098 A1 | 2/2011 | Goto et al. |
| 2011/0035141 A1 | 2/2011 | Barker et al. |
| 2011/0040438 A1 | 2/2011 | Kluge et al. |
| 2011/0050589 A1 | 3/2011 | Yan et al. |
| 2011/0053506 A1 | 3/2011 | Lemke et al. |
| 2011/0077808 A1 | 3/2011 | Hyde et al. |
| 2011/0078024 A1 | 3/2011 | Messier et al. |
| 2011/0080282 A1 | 4/2011 | Kleve et al. |
| 2011/0082615 A1 | 4/2011 | Small et al. |
| 2011/0084824 A1 | 4/2011 | Tewari et al. |
| 2011/0090078 A1 | 4/2011 | Kim et al. |
| 2011/0092159 A1 | 4/2011 | Park et al. |
| 2011/0093154 A1 | 4/2011 | Moinzadeh et al. |
| 2011/0093158 A1 | 4/2011 | Theisen et al. |
| 2011/0093438 A1 | 4/2011 | Poulsen |
| 2011/0093846 A1 | 4/2011 | Moinzadeh et al. |
| 2011/0105097 A1 | 5/2011 | Tadayon et al. |
| 2011/0106375 A1 | 5/2011 | Sundaram et al. |
| 2011/0112717 A1 | 5/2011 | Resner |
| 2011/0112969 A1 | 5/2011 | Zaid et al. |
| 2011/0117933 A1 | 5/2011 | Andersson |
| 2011/0119344 A1 | 5/2011 | Eustis |
| 2011/0130915 A1 | 6/2011 | Wright et al. |
| 2011/0134749 A1 | 6/2011 | Speks et al. |
| 2011/0137520 A1 | 6/2011 | Rector et al. |
| 2011/0145331 A1 | 6/2011 | Christie et al. |
| 2011/0172873 A1 | 7/2011 | Szwabowski et al. |
| 2011/0175754 A1 | 7/2011 | Karpinsky |
| 2011/0183658 A1 | 7/2011 | Zellner |
| 2011/0187520 A1 | 8/2011 | Filev et al. |
| 2011/0193707 A1 | 8/2011 | Ngo |
| 2011/0193726 A1 | 8/2011 | Szwabowski et al. |
| 2011/0195699 A1 | 8/2011 | Tadayon et al. |
| 2011/0197187 A1 | 8/2011 | Roh |
| 2011/0205047 A1 | 8/2011 | Patel et al. |
| 2011/0209079 A1 | 8/2011 | Tarte et al. |
| 2011/0210867 A1 | 9/2011 | Benedikt |
| 2011/0212717 A1 | 9/2011 | Rhoads et al. |
| 2011/0221656 A1 | 9/2011 | Haddick et al. |
| 2011/0224865 A1 | 9/2011 | Gordon et al. |
| 2011/0224898 A1 | 9/2011 | Scofield et al. |
| 2011/0225527 A1 | 9/2011 | Law et al. |
| 2011/0227757 A1 | 9/2011 | Chen et al. |
| 2011/0231091 A1 | 9/2011 | Gourlay et al. |
| 2011/0234369 A1 | 9/2011 | Cai et al. |
| 2011/0245999 A1 | 10/2011 | Kordonowy |
| 2011/0246210 A1 | 10/2011 | Matsur |
| 2011/0247013 A1 | 10/2011 | Feller et al. |
| 2011/0251734 A1 | 10/2011 | Schepp et al. |
| 2011/0257973 A1 | 10/2011 | Chutorash et al. |
| 2011/0267204 A1 | 11/2011 | Chuang et al. |
| 2011/0267205 A1 | 11/2011 | McClellan et al. |
| 2011/0286676 A1 | 11/2011 | El Dokor |
| 2011/0291886 A1 | 12/2011 | Krieter |
| 2011/0291926 A1 | 12/2011 | Gokturk et al. |
| 2011/0298808 A1 | 12/2011 | Rovik |
| 2011/0301844 A1 | 12/2011 | Aono |
| 2011/0307354 A1 | 12/2011 | Erman et al. |
| 2011/0307570 A1 | 12/2011 | Speks |
| 2011/0309926 A1 | 12/2011 | Eikelenberg et al. |
| 2011/0309953 A1 | 12/2011 | Petite et al. |
| 2011/0313653 A1 | 12/2011 | Lindner |
| 2011/0320089 A1 | 12/2011 | Lewis |
| 2012/0006610 A1 | 1/2012 | Wallace et al. |
| 2012/0010807 A1 | 1/2012 | Zhou |
| 2012/0016581 A1 | 1/2012 | Mochizuki et al. |
| 2012/0029852 A1 | 2/2012 | Goff et al. |
| 2012/0030002 A1 | 2/2012 | Bous et al. |
| 2012/0030512 A1 | 2/2012 | Wadhwa et al. |
| 2012/0038489 A1 | 2/2012 | Goldshmidt |
| 2012/0046822 A1 | 2/2012 | Anderson |
| 2012/0047530 A1 | 2/2012 | Shkedi |
| 2012/0053793 A1 | 3/2012 | Sala et al. |
| 2012/0053888 A1 | 3/2012 | Stahlin et al. |
| 2012/0059789 A1 | 3/2012 | Sakai et al. |
| 2012/0065815 A1 | 3/2012 | Hess |
| 2012/0065834 A1 | 3/2012 | Senart |
| 2012/0068956 A1 | 3/2012 | Jira et al. |
| 2012/0071097 A1 | 3/2012 | Matsushita et al. |
| 2012/0072244 A1 | 3/2012 | Collins et al. |
| 2012/0074770 A1 | 3/2012 | Lee |
| 2012/0083960 A1 | 4/2012 | Zhu et al. |
| 2012/0083971 A1 | 4/2012 | Preston |
| 2012/0084773 A1 | 4/2012 | Lee et al. |
| 2012/0089299 A1 | 4/2012 | Breed |
| 2012/0092251 A1 | 4/2012 | Hashimoto et al. |

(56) References Cited

U.S. PATENT DOCUMENTS

| | | |
|---|---|---|
| 2012/0101876 A1 | 4/2012 | Truvey et al. |
| 2012/0101914 A1 | 4/2012 | Kumar et al. |
| 2012/0105613 A1 | 5/2012 | Weng et al. |
| 2012/0106114 A1 | 5/2012 | Caron et al. |
| 2012/0109446 A1 | 5/2012 | Yousefi et al. |
| 2012/0109451 A1 | 5/2012 | Tan |
| 2012/0110356 A1 | 5/2012 | Yousefi et al. |
| 2012/0113822 A1 | 5/2012 | Letner |
| 2012/0115446 A1 | 5/2012 | Guatama et al. |
| 2012/0116609 A1 | 5/2012 | Jung et al. |
| 2012/0116678 A1 | 5/2012 | Witmer |
| 2012/0116696 A1 | 5/2012 | Wank |
| 2012/0146766 A1 | 6/2012 | Geisler et al. |
| 2012/0146809 A1 | 6/2012 | Oh et al. |
| 2012/0149341 A1 | 6/2012 | Tadayon et al. |
| 2012/0150651 A1 | 6/2012 | Hoffberg et al. |
| 2012/0155636 A1 | 6/2012 | Muthaiah |
| 2012/0158436 A1 | 6/2012 | Bauer et al. |
| 2012/0173900 A1 | 7/2012 | Diab et al. |
| 2012/0173905 A1 | 7/2012 | Diab et al. |
| 2012/0179325 A1 | 7/2012 | Faenger |
| 2012/0179547 A1 | 7/2012 | Besore et al. |
| 2012/0188876 A1 | 7/2012 | Chow et al. |
| 2012/0197523 A1 | 8/2012 | Kirsch |
| 2012/0197669 A1 | 8/2012 | Kote et al. |
| 2012/0204166 A1 | 8/2012 | Ichihara |
| 2012/0210160 A1 | 8/2012 | Fuhrman |
| 2012/0215375 A1 | 8/2012 | Chang |
| 2012/0217928 A1 | 8/2012 | Kulidjian |
| 2012/0218125 A1 | 8/2012 | Demirdjian et al. |
| 2012/0226413 A1 | 9/2012 | Chen et al. |
| 2012/0238286 A1 | 9/2012 | Mallavarapu et al. |
| 2012/0239242 A1 | 9/2012 | Uehara |
| 2012/0242510 A1 | 9/2012 | Choi et al. |
| 2012/0254763 A1 | 10/2012 | Protopapas et al. |
| 2012/0254804 A1 | 10/2012 | Shema et al. |
| 2012/0259951 A1 | 10/2012 | Schalk et al. |
| 2012/0265359 A1 | 10/2012 | Das |
| 2012/0274459 A1 | 11/2012 | Jaisimha et al. |
| 2012/0274481 A1 | 11/2012 | Ginsberg et al. |
| 2012/0284292 A1 | 11/2012 | Rechsteiner et al. |
| 2012/0289217 A1 | 11/2012 | Reimer et al. |
| 2012/0289253 A1 | 11/2012 | Haag et al. |
| 2012/0296567 A1 | 11/2012 | Breed |
| 2012/0313771 A1 | 12/2012 | Wottlifff, III |
| 2012/0316720 A1 | 12/2012 | Hyde et al. |
| 2012/0317561 A1 | 12/2012 | Aslam et al. |
| 2012/0323413 A1 | 12/2012 | Kedar-Dongarkar et al. |
| 2012/0327231 A1 | 12/2012 | Cochran et al. |
| 2013/0005263 A1 | 1/2013 | Sakata |
| 2013/0005414 A1 | 1/2013 | Bindra et al. |
| 2013/0013157 A1 | 1/2013 | Kim et al. |
| 2013/0019252 A1 | 1/2013 | Haase et al. |
| 2013/0024060 A1 | 1/2013 | Sukkarie et al. |
| 2013/0030645 A1 | 1/2013 | Divine et al. |
| 2013/0030811 A1 | 1/2013 | Olleon et al. |
| 2013/0031540 A1 | 1/2013 | Throop et al. |
| 2013/0031541 A1 | 1/2013 | Wilks et al. |
| 2013/0035063 A1 | 2/2013 | Fisk et al. |
| 2013/0046624 A1 | 2/2013 | Calman |
| 2013/0050069 A1 | 2/2013 | Ota |
| 2013/0055096 A1 | 2/2013 | Kim et al. |
| 2013/0059607 A1 | 3/2013 | Herz et al. |
| 2013/0063336 A1 | 3/2013 | Sugimoto et al. |
| 2013/0066512 A1 | 3/2013 | Willard et al. |
| 2013/0067599 A1 | 3/2013 | Raje et al. |
| 2013/0075530 A1 | 3/2013 | Shander et al. |
| 2013/0079964 A1 | 3/2013 | Sukkarie et al. |
| 2013/0083805 A1 | 4/2013 | Lu et al. |
| 2013/0085787 A1 | 4/2013 | Gore et al. |
| 2013/0086164 A1 | 4/2013 | Wheeler et al. |
| 2013/0099915 A1 | 4/2013 | Prasad et al. |
| 2013/0103196 A1 | 4/2013 | Monceaux et al. |
| 2013/0116882 A1 | 5/2013 | Link et al. |
| 2013/0116915 A1 | 5/2013 | Ferreira et al. |
| 2013/0134730 A1 | 5/2013 | Ricci |
| 2013/0135118 A1 | 5/2013 | Ricci |
| 2013/0138591 A1 | 5/2013 | Ricci |
| 2013/0138714 A1 | 5/2013 | Ricci |
| 2013/0139140 A1 | 5/2013 | Rao et al. |
| 2013/0141247 A1 | 6/2013 | Ricci |
| 2013/0141252 A1 | 6/2013 | Ricci |
| 2013/0143495 A1 | 6/2013 | Ricci |
| 2013/0143546 A1 | 6/2013 | Ricci |
| 2013/0143601 A1 | 6/2013 | Ricci |
| 2013/0144459 A1 | 6/2013 | Ricci |
| 2013/0144460 A1 | 6/2013 | Ricci |
| 2013/0144461 A1 | 6/2013 | Ricci |
| 2013/0144462 A1 | 6/2013 | Ricci |
| 2013/0144463 A1 | 6/2013 | Ricci et al. |
| 2013/0144469 A1 | 6/2013 | Ricci |
| 2013/0144470 A1 | 6/2013 | Ricci |
| 2013/0144474 A1 | 6/2013 | Ricci |
| 2013/0144486 A1 | 6/2013 | Ricci |
| 2013/0144520 A1 | 6/2013 | Ricci |
| 2013/0144657 A1 | 6/2013 | Ricci |
| 2013/0145065 A1 | 6/2013 | Ricci |
| 2013/0145279 A1 | 6/2013 | Ricci |
| 2013/0145297 A1 | 6/2013 | Ricci et al. |
| 2013/0145360 A1 | 6/2013 | Ricci |
| 2013/0145401 A1 | 6/2013 | Ricci |
| 2013/0145482 A1 | 6/2013 | Ricci et al. |
| 2013/0147638 A1 | 6/2013 | Ricci |
| 2013/0151031 A1 | 6/2013 | Ricci |
| 2013/0151065 A1 | 6/2013 | Ricci |
| 2013/0151088 A1 | 6/2013 | Ricci |
| 2013/0151288 A1 | 6/2013 | Bowne et al. |
| 2013/0152003 A1 | 6/2013 | Ricci et al. |
| 2013/0154298 A1 | 6/2013 | Ricci |
| 2013/0157640 A1 | 6/2013 | Aycock |
| 2013/0157647 A1 | 6/2013 | Kolodziej |
| 2013/0158778 A1 | 6/2013 | Tengler et al. |
| 2013/0158821 A1 | 6/2013 | Ricci |
| 2013/0166096 A1 | 6/2013 | Jotanovic |
| 2013/0166097 A1 | 6/2013 | Ricci |
| 2013/0166098 A1 | 6/2013 | Lavie et al. |
| 2013/0166152 A1 | 6/2013 | Butterworth |
| 2013/0166208 A1 | 6/2013 | Forstall et al. |
| 2013/0167159 A1 | 6/2013 | Ricci et al. |
| 2013/0173531 A1 | 7/2013 | Rinearson et al. |
| 2013/0179689 A1 | 7/2013 | Matsumoto et al. |
| 2013/0190978 A1 | 7/2013 | Kato et al. |
| 2013/0194108 A1 | 8/2013 | Lapiotis et al. |
| 2013/0197796 A1 | 8/2013 | Obradovich et al. |
| 2013/0198031 A1 | 8/2013 | Mitchell et al. |
| 2013/0198737 A1 | 8/2013 | Ricci |
| 2013/0198802 A1 | 8/2013 | Ricci |
| 2013/0200991 A1 | 8/2013 | Ricci et al. |
| 2013/0203400 A1 | 8/2013 | Ricci |
| 2013/0204455 A1 | 8/2013 | Chia et al. |
| 2013/0204457 A1 | 8/2013 | King |
| 2013/0204466 A1 | 8/2013 | Ricci |
| 2013/0204484 A1 | 8/2013 | Ricci |
| 2013/0204493 A1 | 8/2013 | Ricci et al. |
| 2013/0204943 A1 | 8/2013 | Ricci |
| 2013/0205026 A1 | 8/2013 | Ricci |
| 2013/0205412 A1 | 8/2013 | Ricci |
| 2013/0207794 A1 | 8/2013 | Patel et al. |
| 2013/0212065 A1 | 8/2013 | Rahnama |
| 2013/0212659 A1 | 8/2013 | Maher et al. |
| 2013/0215116 A1 | 8/2013 | Siddique et al. |
| 2013/0218412 A1 | 8/2013 | Ricci |
| 2013/0218445 A1 | 8/2013 | Basir |
| 2013/0219039 A1 | 8/2013 | Ricci |
| 2013/0226365 A1 | 8/2013 | Brozovich |
| 2013/0226371 A1 | 8/2013 | Rovik et al. |
| 2013/0226392 A1 | 8/2013 | Schneider et al. |
| 2013/0226449 A1 | 8/2013 | Rovik et al. |
| 2013/0226622 A1 | 8/2013 | Adamson et al. |
| 2013/0227648 A1 | 8/2013 | Ricci |
| 2013/0231784 A1 | 9/2013 | Rovik et al. |
| 2013/0231800 A1 | 9/2013 | Ricci |
| 2013/0232142 A1 | 9/2013 | Nielsen et al. |
| 2013/0238165 A1 | 9/2013 | Garrett et al. |

(56) References Cited

U.S. PATENT DOCUMENTS

| | | |
|---|---|---|
| 2013/0241720 A1 | 9/2013 | Ricci et al. |
| 2013/0245882 A1 | 9/2013 | Ricci |
| 2013/0250933 A1 | 9/2013 | Yousefi et al. |
| 2013/0261871 A1 | 10/2013 | Hobbs et al. |
| 2013/0261966 A1 | 10/2013 | Wang et al. |
| 2013/0265178 A1 | 10/2013 | Tengler et al. |
| 2013/0274997 A1 | 10/2013 | Chien |
| 2013/0279111 A1 | 10/2013 | Lee |
| 2013/0279491 A1 | 10/2013 | Rubin et al. |
| 2013/0282238 A1 | 10/2013 | Ricci et al. |
| 2013/0282357 A1 | 10/2013 | Rubin et al. |
| 2013/0282946 A1 | 10/2013 | Ricci |
| 2013/0288606 A1 | 10/2013 | Kirsch |
| 2013/0293364 A1 | 11/2013 | Ricci et al. |
| 2013/0293452 A1 | 11/2013 | Ricci et al. |
| 2013/0293480 A1 | 11/2013 | Kritt et al. |
| 2013/0295901 A1 | 11/2013 | Abramson et al. |
| 2013/0295908 A1 | 11/2013 | Zeinstra et al. |
| 2013/0295913 A1 | 11/2013 | Matthews et al. |
| 2013/0300554 A1 | 11/2013 | Braden |
| 2013/0301584 A1 | 11/2013 | Addepalli et al. |
| 2013/0304371 A1 | 11/2013 | Kitatani et al. |
| 2013/0308265 A1 | 11/2013 | Arnouse |
| 2013/0309977 A1 | 11/2013 | Heines et al. |
| 2013/0311038 A1 | 11/2013 | Kim et al. |
| 2013/0325453 A1 | 12/2013 | Levien et al. |
| 2013/0325568 A1 | 12/2013 | Mangalvedkar et al. |
| 2013/0329372 A1 | 12/2013 | Wilkins |
| 2013/0332023 A1 | 12/2013 | Bertosa et al. |
| 2013/0338914 A1 | 12/2013 | Weiss |
| 2013/0339027 A1 | 12/2013 | Dokor et al. |
| 2013/0345929 A1 | 12/2013 | Bowden et al. |
| 2014/0028542 A1 | 1/2014 | Lovitt et al. |
| 2014/0032014 A1 | 1/2014 | DeBiasio et al. |
| 2014/0054957 A1 | 2/2014 | Bellis |
| 2014/0058672 A1 | 2/2014 | Wansley et al. |
| 2014/0066014 A1 | 3/2014 | Nicholson et al. |
| 2014/0067201 A1 | 3/2014 | Visintainer et al. |
| 2014/0067564 A1 | 3/2014 | Yuan |
| 2014/0070917 A1 | 3/2014 | Protopapas |
| 2014/0081544 A1 | 3/2014 | Fry |
| 2014/0088798 A1 | 3/2014 | Himmelstein |
| 2014/0096068 A1 | 4/2014 | Dewan et al. |
| 2014/0097955 A1 | 4/2014 | Lovitt et al. |
| 2014/0109075 A1 | 4/2014 | Hoffman et al. |
| 2014/0109080 A1 | 4/2014 | Ricci |
| 2014/0120829 A1 | 5/2014 | Bhamidipati et al. |
| 2014/0121862 A1 | 5/2014 | Zarrella et al. |
| 2014/0125802 A1 | 5/2014 | Beckert et al. |
| 2014/0143839 A1 | 5/2014 | Ricci |
| 2014/0164611 A1 | 6/2014 | Molettiere et al. |
| 2014/0168062 A1 | 6/2014 | Katz et al. |
| 2014/0168436 A1 | 6/2014 | Pedicino |
| 2014/0169621 A1 | 6/2014 | Burr |
| 2014/0171752 A1 | 6/2014 | Park et al. |
| 2014/0172727 A1 | 6/2014 | Abhyanker et al. |
| 2014/0188533 A1 | 7/2014 | Davidson |
| 2014/0195272 A1 | 7/2014 | Sadiq et al. |
| 2014/0198216 A1 | 7/2014 | Zhai et al. |
| 2014/0200737 A1 | 7/2014 | Lortz et al. |
| 2014/0207328 A1 | 7/2014 | Wolf et al. |
| 2014/0220966 A1 | 8/2014 | Muetzel et al. |
| 2014/0222298 A1 | 8/2014 | Gurin |
| 2014/0223384 A1 | 8/2014 | Graumann |
| 2014/0240089 A1 | 8/2014 | Chang |
| 2014/0244078 A1 | 8/2014 | Downey et al. |
| 2014/0244111 A1 | 8/2014 | Gross et al. |
| 2014/0244156 A1 | 8/2014 | Magnusson et al. |
| 2014/0245277 A1 | 8/2014 | Petro et al. |
| 2014/0245278 A1 | 8/2014 | Zellen |
| 2014/0245284 A1 | 8/2014 | Alrabady et al. |
| 2014/0252091 A1 | 9/2014 | Morse et al. |
| 2014/0257627 A1 | 9/2014 | Hagan, Jr. |
| 2014/0267035 A1 | 9/2014 | Schalk et al. |
| 2014/0277936 A1 | 9/2014 | El Dokor et al. |
| 2014/0278070 A1 | 9/2014 | McGavran et al. |
| 2014/0278071 A1 | 9/2014 | San Filippo et al. |
| 2014/0281971 A1 | 9/2014 | Isbell, III et al. |
| 2014/0282161 A1 | 9/2014 | Cash |
| 2014/0282278 A1 | 9/2014 | Anderson et al. |
| 2014/0282470 A1 | 9/2014 | Buga et al. |
| 2014/0282931 A1 | 9/2014 | Protopapas |
| 2014/0292545 A1 | 10/2014 | Nemoto |
| 2014/0292665 A1 | 10/2014 | Lathrop et al. |
| 2014/0303899 A1 | 10/2014 | Fung |
| 2014/0306799 A1 | 10/2014 | Ricci |
| 2014/0306814 A1 | 10/2014 | Ricci |
| 2014/0306817 A1 | 10/2014 | Ricci |
| 2014/0306826 A1 | 10/2014 | Ricci |
| 2014/0306833 A1 | 10/2014 | Ricci |
| 2014/0306834 A1 | 10/2014 | Ricci |
| 2014/0306835 A1 | 10/2014 | Ricci |
| 2014/0307655 A1 | 10/2014 | Ricci |
| 2014/0307724 A1 | 10/2014 | Ricci |
| 2014/0308902 A1 | 10/2014 | Ricci |
| 2014/0309789 A1 | 10/2014 | Ricci |
| 2014/0309790 A1 | 10/2014 | Ricci |
| 2014/0309804 A1 | 10/2014 | Ricci |
| 2014/0309805 A1 | 10/2014 | Ricci |
| 2014/0309806 A1 | 10/2014 | Ricci |
| 2014/0309813 A1 | 10/2014 | Ricci |
| 2014/0309814 A1 | 10/2014 | Ricci et al. |
| 2014/0309815 A1 | 10/2014 | Ricci et al. |
| 2014/0309838 A1 | 10/2014 | Ricci |
| 2014/0309839 A1 | 10/2014 | Ricci et al. |
| 2014/0309847 A1 | 10/2014 | Ricci |
| 2014/0309849 A1 | 10/2014 | Ricci |
| 2014/0309852 A1 | 10/2014 | Ricci |
| 2014/0309853 A1 | 10/2014 | Ricci |
| 2014/0309862 A1 | 10/2014 | Ricci |
| 2014/0309863 A1 | 10/2014 | Ricci |
| 2014/0309864 A1 | 10/2014 | Ricci |
| 2014/0309865 A1 | 10/2014 | Ricci |
| 2014/0309866 A1 | 10/2014 | Ricci |
| 2014/0309867 A1 | 10/2014 | Ricci |
| 2014/0309868 A1 | 10/2014 | Ricci |
| 2014/0309869 A1 | 10/2014 | Ricci |
| 2014/0309870 A1 | 10/2014 | Ricci et al. |
| 2014/0309871 A1 | 10/2014 | Ricci |
| 2014/0309872 A1 | 10/2014 | Ricci |
| 2014/0309873 A1 | 10/2014 | Ricci |
| 2014/0309874 A1 | 10/2014 | Ricci |
| 2014/0309875 A1 | 10/2014 | Ricci |
| 2014/0309876 A1 | 10/2014 | Ricci |
| 2014/0309877 A1 | 10/2014 | Ricci |
| 2014/0309878 A1 | 10/2014 | Ricci |
| 2014/0309879 A1 | 10/2014 | Ricci |
| 2014/0309880 A1 | 10/2014 | Ricci |
| 2014/0309885 A1 | 10/2014 | Ricci |
| 2014/0309886 A1 | 10/2014 | Ricci |
| 2014/0309891 A1 | 10/2014 | Ricci |
| 2014/0309892 A1 | 10/2014 | Ricci |
| 2014/0309893 A1 | 10/2014 | Ricci |
| 2014/0309913 A1 | 10/2014 | Ricci et al. |
| 2014/0309919 A1 | 10/2014 | Ricci |
| 2014/0309920 A1 | 10/2014 | Ricci |
| 2014/0309921 A1 | 10/2014 | Ricci et al. |
| 2014/0309922 A1 | 10/2014 | Ricci |
| 2014/0309923 A1 | 10/2014 | Ricci |
| 2014/0309927 A1 | 10/2014 | Ricci |
| 2014/0309929 A1 | 10/2014 | Ricci |
| 2014/0309930 A1 | 10/2014 | Ricci |
| 2014/0309934 A1 | 10/2014 | Ricci |
| 2014/0309935 A1 | 10/2014 | Ricci |
| 2014/0309982 A1 | 10/2014 | Ricci |
| 2014/0310031 A1 | 10/2014 | Ricci |
| 2014/0310075 A1 | 10/2014 | Ricci |
| 2014/0310103 A1 | 10/2014 | Ricci |
| 2014/0310186 A1 | 10/2014 | Ricci |
| 2014/0310277 A1 | 10/2014 | Ricci |
| 2014/0310379 A1 | 10/2014 | Ricci et al. |
| 2014/0310594 A1 | 10/2014 | Ricci et al. |
| 2014/0310610 A1 | 10/2014 | Ricci |
| 2014/0310702 A1 | 10/2014 | Ricci et al. |

(56) References Cited

U.S. PATENT DOCUMENTS

| | | |
|---|---|---|
| 2014/0310739 A1 | 10/2014 | Ricci et al. |
| 2014/0310788 A1 | 10/2014 | Ricci |
| 2014/0322676 A1 | 10/2014 | Raman |
| 2014/0337930 A1* | 11/2014 | Hoyos .................... H04L 63/10 726/4 |
| 2014/0347207 A1 | 11/2014 | Zeng et al. |
| 2014/0347265 A1 | 11/2014 | Allen et al. |
| 2015/0007155 A1 | 1/2015 | Hoffman et al. |
| 2015/0012186 A1 | 1/2015 | Horseman |
| 2015/0032366 A1 | 1/2015 | Man et al. |
| 2015/0032670 A1 | 1/2015 | Brazell |
| 2015/0048927 A1 | 2/2015 | Simmons |
| 2015/0049910 A1* | 2/2015 | Ptucha .................... G06F 16/51 382/103 |
| 2015/0057839 A1 | 2/2015 | Chang et al. |
| 2015/0061895 A1 | 3/2015 | Ricci |
| 2015/0081133 A1 | 3/2015 | Schulz |
| 2015/0081167 A1 | 3/2015 | Pisz et al. |
| 2015/0088423 A1 | 3/2015 | Tuukkanen |
| 2015/0088515 A1 | 3/2015 | Beaumont et al. |
| 2015/0116200 A1 | 4/2015 | Kurosawa et al. |
| 2015/0158499 A1 | 6/2015 | Koravadi |
| 2015/0161836 A1* | 6/2015 | Park .................... G06K 9/00355 340/5.51 |
| 2015/0178034 A1 | 6/2015 | Penilla et al. |
| 2015/0279131 A1 | 10/2015 | Nespolo |
| 2015/0363986 A1* | 12/2015 | Hoyos .................... H05K 999/99 340/5.61 |
| 2016/0008985 A1 | 1/2016 | Kim et al. |
| 2016/0012301 A1* | 1/2016 | Arndt .................... B60W 50/14 382/104 |
| 2016/0070527 A1 | 3/2016 | Ricci |
| 2016/0086391 A1 | 3/2016 | Ricci |
| 2016/0269456 A1 | 9/2016 | Ricci |
| 2016/0269469 A1 | 9/2016 | Ricci |
| 2016/0297324 A1* | 10/2016 | Taylor .................... B60N 2/002 |
| 2016/0300410 A1* | 10/2016 | Jones .................... G06K 9/00288 |
| 2016/0345907 A1* | 12/2016 | Fung .................... A61B 5/0295 |
| 2016/0358395 A1* | 12/2016 | Dry .................... G07C 9/00309 |
| 2017/0228029 A1 | 8/2017 | Wexler et al. |
| 2017/0228597 A1 | 8/2017 | Wexler et al. |
| 2018/0103022 A1* | 4/2018 | Tokunaga .................... B60R 25/24 |
| 2018/0204111 A1* | 7/2018 | Zadeh .................... G06N 3/0436 |
| 2018/0215347 A1* | 8/2018 | Weghaus .................... B60R 25/102 |
| 2018/0247067 A1* | 8/2018 | Hrabak .................... G06F 21/6218 |
| 2019/0003439 A1* | 1/2019 | Chaplow .................... G07C 9/00309 |
| 2019/0011990 A1* | 1/2019 | Jeon .................... B60K 35/00 |
| 2019/0047511 A1* | 2/2019 | Link, II .................... B60R 25/24 |
| 2019/0051173 A1* | 2/2019 | Kang .................... G08G 1/166 |
| 2019/0087009 A1* | 3/2019 | Rao .................... G01S 7/415 |
| 2019/0112858 A1* | 4/2019 | Partsch .................... E05F 15/40 |
| 2019/0126889 A1* | 5/2019 | Oman .................... G01S 7/41 |
| 2019/0141756 A1* | 5/2019 | Lei .................... H04W 76/10 |
| 2019/0156603 A1* | 5/2019 | Breer .................... B60R 25/24 |
| 2019/0190980 A1* | 6/2019 | Penilla .................... H04L 67/06 |
| 2019/0263422 A1* | 8/2019 | Enthaler .................... G06K 9/00604 |
| 2019/0278454 A1* | 9/2019 | Washeleski .................... G06F 3/0304 |

FOREIGN PATENT DOCUMENTS

| | | |
|---|---|---|
| CN | 101303878 | 11/2008 |
| CN | 102467827 | 5/2012 |
| EP | 1223567 | 7/2002 |
| EP | 1484729 | 12/2004 |
| EP | 2192015 | 6/2010 |
| JP | 2004-284450 | 10/2004 |
| KR | 2006-0128484 | 12/2006 |
| WO | WO 2007/126204 | 11/2007 |
| WO | WO 2012/102879 | 8/2012 |
| WO | WO 2013/074866 | 5/2013 |
| WO | WO 2013/074867 | 5/2013 |
| WO | WO 2013/074868 | 5/2013 |
| WO | WO 2013/074897 | 5/2013 |
| WO | WO 2013/074899 | 5/2013 |
| WO | WO 2013/074901 | 5/2013 |
| WO | WO 2013/074919 | 5/2013 |
| WO | WO 2013/074981 | 5/2013 |
| WO | WO 2013/074983 | 5/2013 |
| WO | WO 2013/075005 | 5/2013 |
| WO | WO 2013/181310 | 12/2013 |
| WO | WO 2014/014862 | 1/2014 |
| WO | WO 2014/143563 | 9/2014 |
| WO | WO 2014/158667 | 10/2014 |
| WO | WO 2014/158672 | 10/2014 |
| WO | WO 2014/158766 | 10/2014 |
| WO | WO 2014/172312 | 10/2014 |
| WO | WO 2014/172313 | 10/2014 |
| WO | WO 2014/172316 | 10/2014 |
| WO | WO 2014/172320 | 10/2014 |
| WO | WO 2014/172322 | 10/2014 |
| WO | WO 2014/172323 | 10/2014 |
| WO | WO 2014/172327 | 10/2014 |
| WO | WO 2016/145073 | 9/2016 |
| WO | WO 2016/145100 | 9/2016 |

OTHER PUBLICATIONS

"Connect Your Car! Start, Control, and Locate your Care from Virtually Anywhere," www.viper.com/smartstart, accessed Aug. 2017, available at https://web.archive.org/web/20170802084814/https://www.viper.com/smartstart/, 2009, 4 pages.

"Knock to Unlock," Knock Software website at www.knocktounlock.com, 2013, 13 pages.

"Nexus 10 Guidebook for Android," Google Inc., © 2012, Edition 1.2, 166 pages.

"Self-Driving: Self-Driving Autonomous Cars," available at https://web.archive.org/web/20161018221218/http://www.automotivetechnologies.com/autonomous-self-driving-cars, Oct. 2016, accessed Dec. 2016, 7 pages.

Amor-Segan et al., "Towards the Self Healing Vehicle," Automotive Electronics, Jun. 2007, 2007 3rd Institution of Engineering and Technology Conference, 7 pages.

Bennett, "Meet Samsung's Version of Apple AirPlay," CNET.com, Oct. 10, 2012, 11 pages.

Borade et al., "Smartphone based Vehicle Tracking and Control via Secured Wireless Networks," Int. Journal of Computer Applications, Apr. 2013, vol. 68(7), pp. 11-14.

Cairnie et al., "Using Finger-Pointing to Operate Secondary Controls in Automobiles," Proceedings of the IEEE Intelligent Vehicles Symposium 2000, Oct. 3-5, 2000, 6 pages.

Clark, "How Self-Driving Cars Work: The Nuts and Bolts Behind Google's Autonomous Car Program," Feb. 21, 2015, available at http://www.makeuseof.com/tag/how-self-driving-cars-work-the-nuts-and-bolts-behind-googles-autonomous-car-program/, 9 pages.

Deaton et al., "How Driverless Cars Will Work," Jul. 1, 2008, HowStuffWorks.com. <http://auto.howstuffworks.com/under-the-hood/trends-innovations/driverless-car.htm> Sep. 18, 2017, 10 pages.

Dumbaugh, "Safe Streets, Livable Streets: A Positive Approach to urban Roadside Design," Ph.D. dissertation for School of Civil & Environ. Engr., Georgia Inst. of Technology, Dec. 2005, 235 pages.

Fei et al., "A QoS-aware Dynamic Bandwidth Allocation Algorithm for Relay Stations in IEEE 802.16j-based Vehicular Networks," Proceedings of the 2010 IEEE Global Telecommunications Conference, Dec. 10, 2010, 10 pages.

Ge et al., "Optimal Relay Selection in IEEE 802.16j Multihop Relay Vehicular Networks," IEEE Transactions on Vehicular Technology, 2010, vol. 59(5), pp. 2198-2206.

Guizzo, Erico, "How Google's Self-Driving Car Works," Oct. 18, 2011, available at https://spectrum.ieee.org/automaton/robotics/artificial-intelligence/how-google-self-driving-car-works, 5 pages.

Heer et al., "ALPHA: An Adaptive and Lightweight Protocol for Hop-by-hop Authentication," Proceedings of CoNEXT 2008, Dec. 2008, pp. 1-12.

Humphries, Matthew, "Invisible key system unlocks doors with a hand gesture," Geek.com, Oct. 3, 2011, available at https://www.geek.com/geek-cetera/invisible-key-system-unlocks-doors-with-a-hand-gesture-1425877/, 2 pages.

(56) References Cited

OTHER PUBLICATIONS

Jahnich et al., "Towards a Middleware Approach for a Self-Configurable Automotive Embedded System," International Federation for Information Processing, 2008, pp. 55-65.

Negm, Adham, "Unlock Your Door With a Hand Gesture," instructables.com, 2016, available at https://www.instructables.com/id/Unlock-Your-Door-With-a-Hand-Gesture/, 7 pages.

Persson, "Adaptive Middleware for Self-Configurable Embedded Real-Time Systems," KTH Industrial Engineering and Management, 2009, pp. iii-71 and references.

Raychaudhuri et al., "Emerging Wireless Technologies and the Future Mobile Internet," p. 48, Cambridge Press, 2011, 3 pages.

Stephens, Leah, "How Driverless Cars Work," Interesting Engineering, Apr. 28, 2016, available at https://interestingengineering.com/driverless-cars-work/, 7 pages.

Stoller, "Leader Election in Distributed Systems with Crash Failures," Indiana University, 1997, pp. 1-15.

Strunk et al., "The Elements of Style," 3d ed., Macmillan Publishing Co., 1979, 3 pages.

Suwatthikul, "Fault detection and diagnosis for in-vehicle networks," Intech, 2010, pp. 283-286 [retrieved from: www.intechopen.com/books/fault-detection-and-diagnosis-for-in-vehicle-networks].

Walter et al., "The smart car seat: personalized monitoring of vital signs in automotive applications." Personal and Ubiquitous Computing, Oct. 2011, vol. 15, No. 7, pp. 707-715.

Wolf et al., "Design, Implementation, and Evaluation of a Vehicular Hardware Security Module," ICISC'11 Proceedings of the 14th Int'l Conf. Information Security & Cryptology, Springer-Verlag Berlin, Heidelberg, 2011, pp. 302-318.

Wooler et al., "Drivers to open cars with a selfie as new technology saves motorists hassle of finding keys," The Sun, a News UK company, Nov. 21, 2016 (updated Feb. 27, 2017), 4 pages.

\* cited by examiner

SYSTEM AND METHOD FOR CONTROLLING A VEHICLE USING SECONDARY ACCESS METHODS

FIELD

The present disclosure is generally related to vehicle systems and in particular to access systems for vehicles.

BACKGROUND

Currently, smartphone applications can be used to unlock a vehicle, such as a car. For example, a smartphone application can unlock a car based on the smartphone being in proximity to the car. In this instance, the smartphone is acting similar to a digital key that allows the person to unlock the car when the person approaches. Alternatively, some smartphone applications may unlock a car remotely. However, current smartphone applications fail to leverage contextual intelligence, which limits the types of features and services that can be provided to a person when approaching the car.

SUMMARY

A message is received that a mobile device is in proximity to a vehicle. For example, a cloud system may receive a message that the mobile device is in proximity to the car of a person. Based on the mobile device being in proximity to the vehicle, sensor information is received from one or more sensors on the vehicle. For example, an array of cameras on the vehicle may be used to detect a gesture made by the person holding the mobile device. The received information from the one or more sensors on the vehicle is processed to identify one or more actions to implement on the vehicle. One or more commands are then sent to implement one or more actions on the vehicle. For example, the one or more commands may be to open a specific door on the vehicle and to turn on a specific heating system in the vehicle.

DETAILED DESCRIPTION

Embodiments of the present disclosure will be described in connection with a vehicle 100, and in some embodiments, an electric vehicle, a rechargeable electric vehicle, a hybrid-electric vehicle, and/or an automated vehicle and associated systems.

Figure 1:
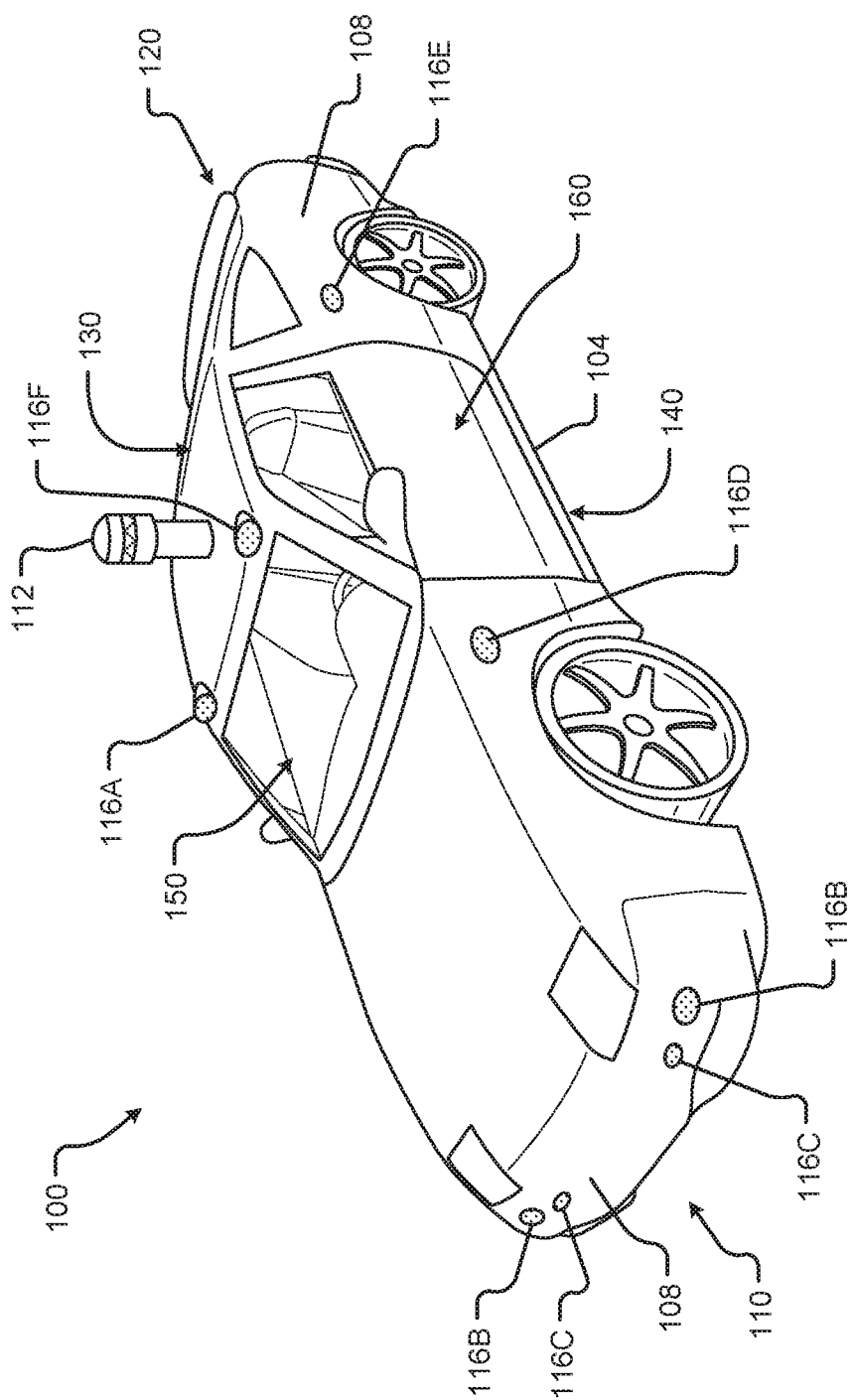
FIG. 1 shows a vehicle in accordance with embodiments of the present disclosure.

FIG. 1 shows a perspective view of a vehicle 100 in accordance with embodiments of the present disclosure. The vehicle 100 comprises a vehicle front 110, a vehicle aft or rear 120, a vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, and/or the like.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" 100 does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, drones, and/or the like.

In some embodiments, the vehicle 100 may include a number of sensors, devices, and/or systems that are capable of assisting in driving operations, e.g., autonomous or semi-autonomous control. These systems typically receive power from a low voltage network (e.g., a 12-volt network). For example, these systems may receive power from a DC/DC converter that provides power to the low voltage network from a vehicle battery pack. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR (Light Imaging, Detection, And Ranging) systems, microphones, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, object-detecting sensors, driver control sensors (e.g., turn signal sensors, light control sensors, wiper control sensors, wiper fluid sensors, seat adjustment sensors, and radio control sensors), fuel sensors, coolant sensors, temperature sensors, whether sensors, road ice detectors, wet road detectors, road sign detectors, occupancy detectors, brake sensors, steering wheel sensors, cruise control sensors, and/or the like. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel 108, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for automated vehicle driving operations. For instance, at Level 0, or fully-manual driving operations, a driver (e.g., a human driver) may be responsible for all the driving control operations (e.g., steering, accelerating, braking, etc.) associated with the automated vehicle. Level 0 may be referred to as a "No Automation" level. At Level 1, the vehicle 100 may be responsible for a limited number of the driving operations associated with the vehicle 100, while the driver is still responsible for most driving control operations. An example of a Level 1 vehicle may include a vehicle 100 in which the throttle control and/or braking operations may be controlled by the vehicle 100 (e.g., cruise control operations, etc.). Level 1 may be referred to as a "Driver Assistance" level. At Level 2, the vehicle 100 may collect information (e.g., via one or more driving assistance systems, sensors, etc.) about an environment of the vehicle 100 (e.g., surrounding area, roadway, traffic, ambient conditions, etc.) and use the collected information to control driving operations (e.g., steering, accelerating, braking, etc.) associated with the vehicle 100. In a Level 2 autonomous vehicle 100, the driver may be required to perform other aspects of driving operations not controlled by the vehicle 100. Level 2 may be referred to as a "Partial Automation" level. It should be appreciated that Levels 0-2 all involve the driver monitoring the driving operations of the vehicle 100.

At Level 3, the driver may be separated from controlling all the driving operations of the vehicle 100 except when the vehicle 100 makes a request for the operator to act or intervene in controlling one or more driving operations. In other words, the driver may be separated from controlling the vehicle 100 unless the driver is required to take over for the vehicle 100. Level 3 may be referred to as a "Conditional Automation" level. At Level 4, the driver may be separated from controlling all the driving operations of the vehicle 100 and the vehicle 100 may control driving operations even when a user fails to respond to a request to intervene. Level 4 may be referred to as a "High Automation" level. At Level 5, the vehicle 100 can control all the driving operations associated with the vehicle 100 in all driving modes. The vehicle 100 in Level 5 may continually monitor traffic, vehicular, roadway, and/or environmental conditions while driving the vehicle 100. In Level 5, there is no human driver interaction required in any driving mode. Accordingly, Level 5 may be referred to as a "Full Automation" level. It should be appreciated that in Levels 3-5 the vehicle 100, and/or one or more automated driving systems associated with the vehicle 100, monitors the driving operations of the vehicle 100 and the driving environment.

As shown in FIG. 1, the vehicle 100 may, for example, include at least one of a ranging and imaging system 112 (e.g., LIDAR, etc.), an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, the LIDAR system 112 and/or sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles 100, pedestrians, and/or other objects near, or proximal to, the vehicle 100. While shown associated with one or more areas of a vehicle 100, it should be appreciated that any of the sensors and systems 116A-K, 112 illustrated in FIG. 1 may be disposed in, on, and/or about the vehicle 100 in any position, area, and/or zone of the vehicle 100.

Figure 2:
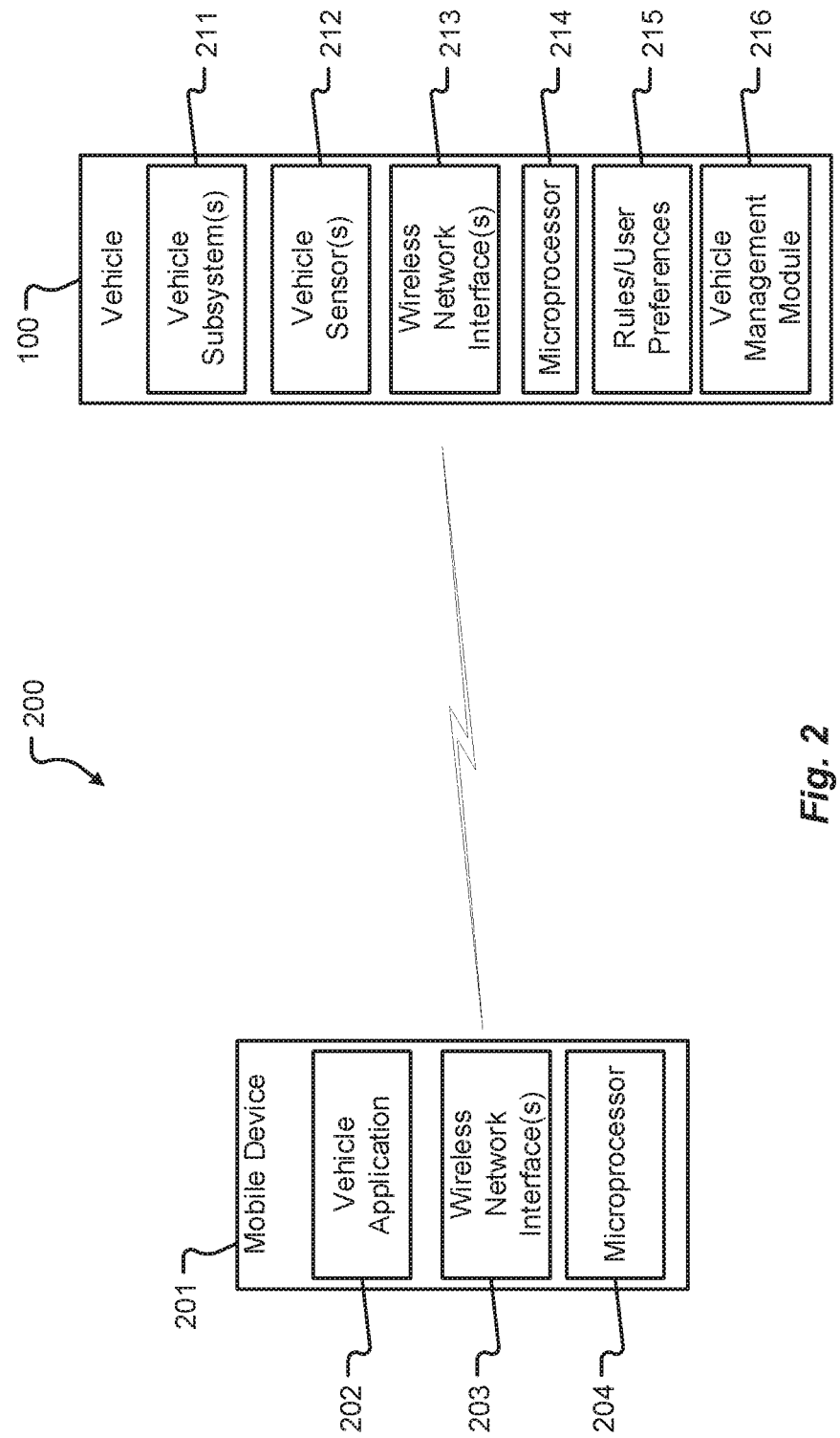
FIG. 2 is a diagram of a first illustrative vehicle access/control system.

FIG. 2 is a diagram of a first illustrative vehicle access/control system 200. The first illustrative vehicle access control system 200 comprises a mobile device 201 and the vehicle 100.

The mobile device 201 can be or may include any physical device that can communicate with the vehicle 100, such as, a cellular telephone, a Personal Digital Assistant (PDA), a tablet device, a notebook device, a smart phone, a digital watch, a smart watch, and/or the like. The mobile device 201 is typically used by a person to gain access when the mobile device 201 is in proximity to the vehicle 100.

The mobile device 201 further comprises a vehicle application 202, a wireless network interface 203, and a microprocessor 204. The vehicle application 202 can be or may include any software/firmware application that provides services/access to the vehicle 100. The vehicle application 202 may be downloaded to the mobile device 201 or preinstalled on the mobile device 101. The vehicle application 202 may provide different services/access to the vehicle 100, such as, providing information gathered by sensors in the mobile device 201. For example, the vehicle application 202, in the mobile device 201, may access information from a camera, a microphone, an accelerometer, a touch screen, a Global Position Satellite (GPS) system, a fingerprint scanner, a biometric scanner, and/or the like that is in the mobile device 201.

The wireless network interface 203, can be or may include any hardware interface coupled with software that can communicate with the wireless network interface 213 on the vehicle 100, such as, a Bluetooth interface, an infrared interface, a WiFi interface, a ZigBee® interface, Radio Frequency Identification (RFID), a cellular interface, and/or the like. The wireless network interface 203 may comprise multiple wireless network interfaces 203 that each supports different wireless protocols. As shown in FIG. 2, the wireless network interface 203 communicates directly with the wireless network interface 213. However, in other embodiments, the wireless network interface 203 may communicate with the wireless network interface 213 using an intermediate network element, such as a wireless access point, a router, a communication system, a cellular network, and/or the like.

The microprocessor 204 can be or may include any hardware microprocessor 204, such as an application specific microprocessor, a Digital Signaling Processor (DSP), a microcontroller, and/or the like.

The vehicle 100 further comprises vehicle subsystem(s) 211, vehicle sensor(s) 212, the wireless network interface(s) 213, a microprocessor 214, rules/user preferences 215, and a vehicle management module 216. The vehicle subsystems 211 can be or may include any hardware/electronic subsystem that can be controlled by the microprocessor 214 and/or other electronic elements (i.e., relays, motors, microcontrollers, etc.). For example, the vehicle subsystems 211 may comprise a door locking/unlocking mechanism (e.g., controlling specific doors), a trunk locking/unlocking mechanism, a hood locking/unlocking mechanism, a breaking system, a seat heating control system, an air conditioning/heating system (e.g., for specific heating/air locations in the vehicle 100), an automobile alarm system, a driving system (e.g., enabling/disabling manual control to drive the vehicle 100), a seat adjustment system (e.g., moving a seat up/down, forward/back, tilt, etc.) a radio system, sound control system (e.g. controlling specific songs to play), a navigation system (e.g., suggesting a specific route), a steering wheel adjustment system, a wiper control system, a window heating element, a window tint level control system, a wheel control system (e.g., 2 wheel drive versus 4 wheel drive), an automatic driving system, a biometric scanner, a light control system (e.g., interior lights, exterior lights, driving lights, etc.), a telephone system, a start control system (e.g., starting the car when a person approaches), and/or the like.

The vehicle sensors 212 can be or may include any hardware sensor that is part of the vehicle 100. For example, the vehicle sensors 212 may be any of the sensors 116 discussed in FIG. 1 and/or other sensors, such as, a camera (to determine gestures/identity/carried objects/distance/types of clothing/other vehicles 100 around the vehicle 100/objects around the vehicle 100 etc.), a radar system, a LIDAR system, an alarm system, a microphone (to detect verbal commands/voice prints), a heat sensor, a touch sensor (e.g., to determine if a person has touched the vehicle 100), an emissions sensor, seat sensor, a temperature sensor (to determine an outside temperature/inside temperature), a weather detection sensor (e.g., to determine if it is snowing or raining), a clock (to determine the time of day), a GPS system (to determine a location of the vehicle 100), and/or the like.

The wireless network interface 213 may by any type of wireless interface, such as wireless interface 203. The wireless network interface 213 may comprise multiple wireless network interfaces 213, such as a cellular interface and a Bluetooth interface.

The microprocessor 214 can be or may include any hardware microprocessor such as described for the microprocessor 204. The microprocessor 214 receives input from the vehicle sensors 212 and controls the vehicle subsystems 211. The microprocessor 214/vehicle management module 216 uses the rules/user preferences 215 to determine how to control the vehicle subsystems 211 based on information provided by the vehicle sensors 212.

The rules/user preferences 215 can be user defined rules/preferences, learned rules/preferences, predefined rules/preferences (e.g., factory-defined preferences). For example, a user may define a rule that when the user approaches the vehicle 100 and makes a specific gesture that the trunk is opened along with the driver's door. If the user makes a second gesture, the driver's door is opened, the seat and steering wheel are adjusted, and the driver's seat heating system is set to a specific temperature defined by the user. If two specific persons approach the vehicle 100 (e.g. two people who regularly use the vehicle 100), the rule may be to open the driver's door and the front passenger's door. A rule may be based on other objects (e.g., other vehicles 100)/persons) around the vehicle 100. For example, when the user approaches the vehicle 100, a camera on the vehicle 100 may detect that an unknown person is in the vehicle 100 or hiding behind the vehicle 100 and warn the approaching person.

Alternatively, the rules/preferences may be learned. For example, if two different users regularly drive the vehicle 100 (e.g., one who is tall and one who is short) and the two different users make adjustments to the driver's seat/steering wheel settings, the vehicle management module 216 can learn specific settings for a specific user. Upon detecting a specific user approaching the vehicle 100, the vehicle management module 216 will set the driver's seat/steering wheel settings appropriately. The learned preferences may be a learned lighting preference for a dashboard. For example, if the user adjusts the dashboard lighting setting to a specific level when it is dark, the system may automatically set the dashboard lighting to the learned level based on identification of the user and the time of day being after sunset.

The rules/user preferences 215 may be predefined settings. For example, a factory setting may be used to detect a specific gesture to turn on lights around the vehicle 100 when a user approaches. A factory setting may be that if a person walks up to the vehicle 100 and is walking like the person is drunk, the rule may be to lock out manual driving and only allow automatic driving so that the user does not drive when drunk.

The vehicle management module 216 is a software/hardware control system that allows the detection of events (e.g., gestures, facial recognition, verbal commands, a user/group of users approaching, a touch of the vehicle 100, an external event (e.g., whether condition around the vehicle 100) etc.) to control the vehicle subsystems 211 based on the rules/user preferences 215.

The detection of events may be based on the microprocessor 214/vehicle management module 216 analyzing an audio stream or a video stream. For example, the microprocessor 214/vehicle management module 216 may digitally process a video stream to identify a particular user's face and compare the face to a group face prints associated with users who can drive the vehicle 100.

Figure 3:
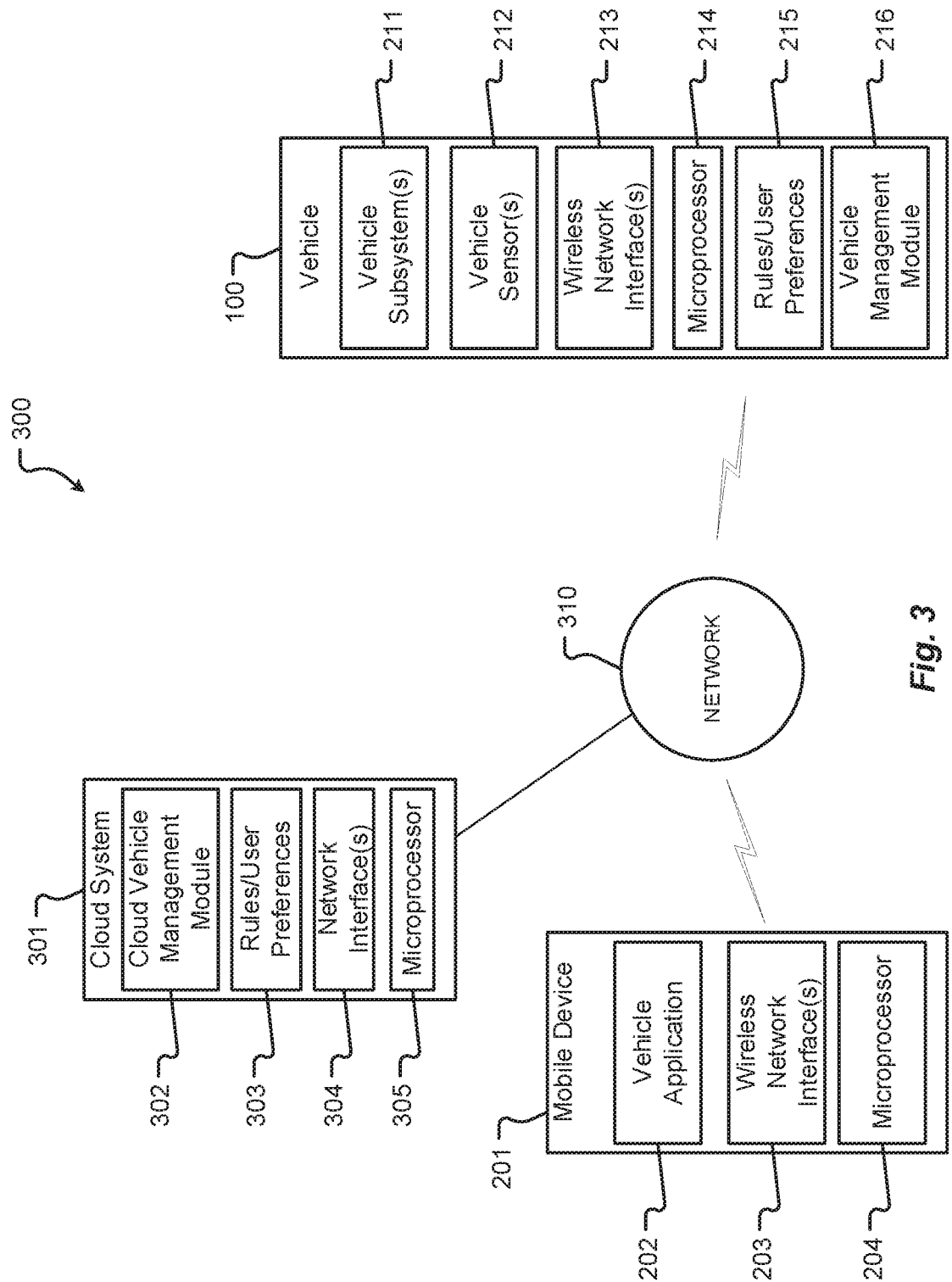
FIG. 3 is a diagram of a second illustrative vehicle access/control system that uses a cloud system.

FIG. 3 is a diagram of a second illustrative vehicle access/control system 300 that uses a cloud system 301. The second illustrative vehicle access/control system 300 comprises the mobile device 201, the vehicle 100, a network 310, and the cloud system 301.

The network 310 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a Bluetooth network, a WiFi network, a combination of these, and the like. The network 310 can use a variety of electronic protocols, such as Ethernet, Internet Protocol (IP), Session Initiation Protocol (SIP), Integrated Services Digital Network (ISDN), Bluetooth, WiFi, cellular protocols, and the like. Thus, the network 310 is an electronic communication network configured to carry messages via packets and/or circuit switched communications.

In FIG. 3, the mobile device 201 and the vehicle 100 are shown connecting to the network 310 to communicate with each other. However, the mobile device 201 and the vehicle 100 may communicate directly (e.g., like shown in FIG. 2) while the mobile device 210 and the vehicle 100 communicate with the cloud system 301 via the network 310.

The cloud system 301 can be any network system that can provide vehicle management services for the vehicle 100. The cloud system 301 may provide vehicle control services for multiple vehicles 100 or groups of vehicles 100. For example, the cloud system 301 may provide vehicle management services for fleet of vehicles 100 of a company or enterprise.

The cloud system 301 comprises a cloud vehicle management module 302, rules/user preferences 303, a network interface 304, and a microprocessor 305. The cloud vehicle management module 302 can be any hardware/software that can manage services for a vehicle 100. The cloud vehicle management module 302 may perform all or many of the same functions as the vehicle management module 216.

The rules/user preferences 303 may be the same or similar to the rules/user preferences 215. In one embodiment, the rules/user preferences 303/215 may be distributed between the cloud system 301 and the vehicle 100 as shown in FIG. 3. Alternatively, the rules/user preferences 303 may only reside in the cloud system 301. In this embodiment, the vehicle 100 would not comprise the rules/user preferences 215.

The network interface 304 may be any kind of network interface 304, such as a wireless interface, a wired interface, a fiber optic interface, and/or the like. The network interface 304 may support a variety of protocols, such as IP, SIP, ISDN, Bluetooth, WiFi, Ethernet, cellular protocols, and/or the like. The network interface 304 may be a wireless network interface similar to the wireless network interfaces 203/213.

The microprocessor 305 can be or may include any processor similar to microprocessors 204/214. The microprocessor 305 in conjunction with the cloud vehicle management module 302 sends and receives messages, via the network interface 304, to communicate with the mobile device 201 and/or the vehicle 100.

Figure 4:
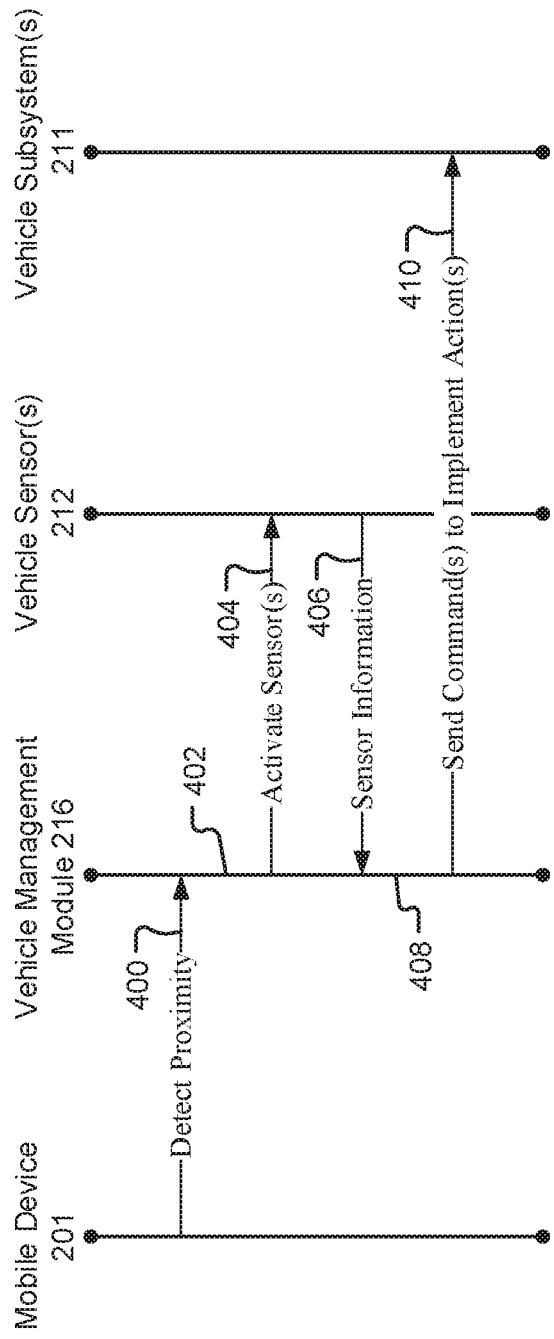
FIG. 4 is a flow diagram of a process for managing a vehicle access/control system.
Figure 5:
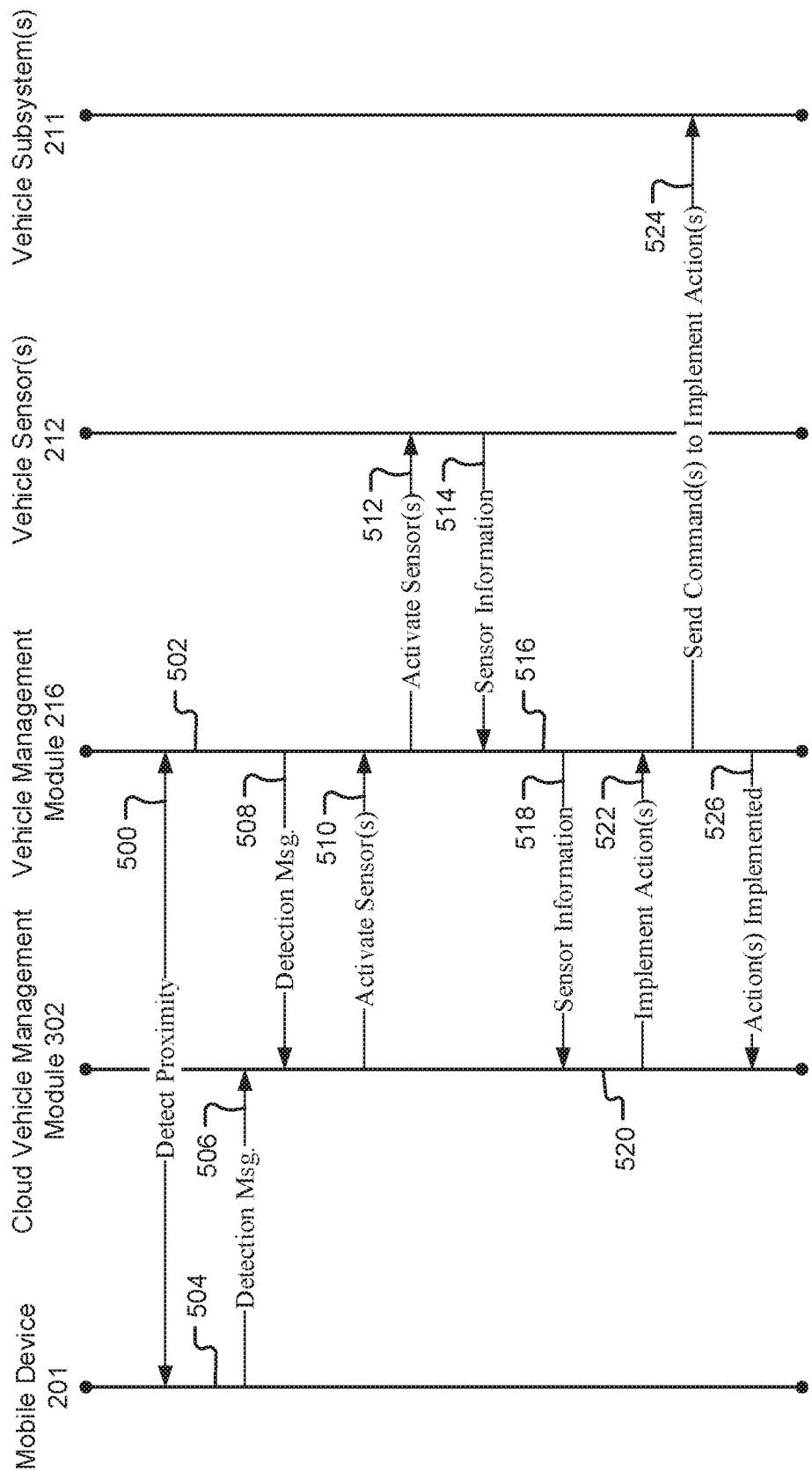
FIG. 5 is a flow diagram of a process for managing a vehicle access/control system controlled by a cloud system.
Figure 6:
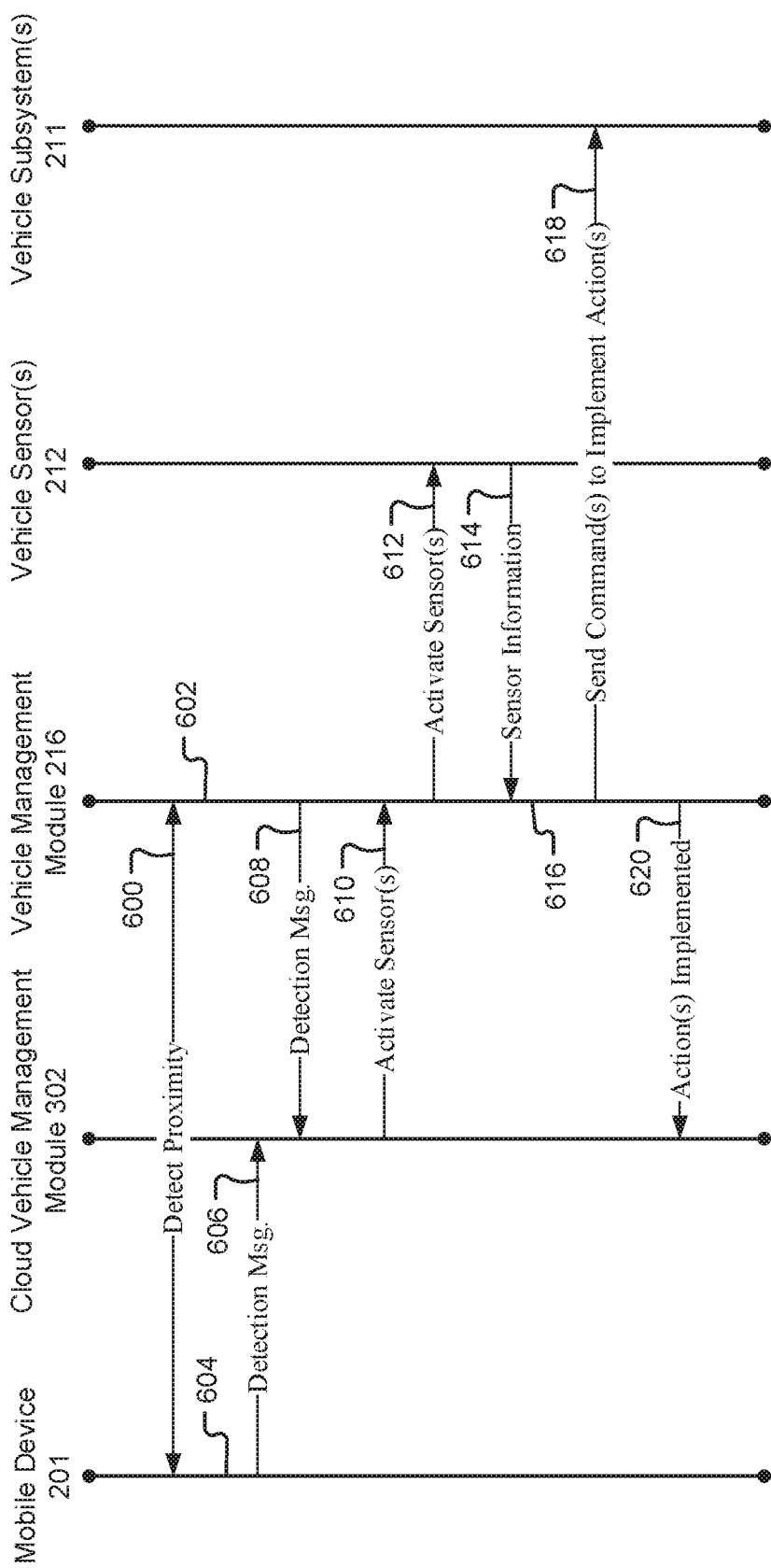
FIG. 6 is a flow diagram of a process for managing a vehicle access/control system with shared control between a vehicle and a cloud system.

FIG. 4 is a flow diagram of a process for managing a vehicle access/control system. Illustratively, mobile device 201, the vehicle application 202, the wireless network interfaces 203/213, the rules/user preferences 215/303, the vehicle management module 216, and the cloud vehicle management module 302 are stored-program-controlled entities, such as a computer or microprocessor, which performs the method of FIGS. 4-6 and the processes described herein by executing program instructions stored in a computer readable storage medium, such as a memory (i.e., a computer memory, a hard disk, and/or the like). Although the methods described in FIGS. 4-6 are shown in a specific order, one of skill in the art would recognize that the steps in FIGS. 4-6 may be implemented in different orders and/or be implemented in a multi-threaded environment. Moreover, various steps may be omitted or added based on implementation.

The process of FIG. 4 is based on the first illustrative vehicle access/control system 200. The process starts in step 400 when the mobile device 201 comes within a predetermined spatial proximity to the vehicle 100 or a vehicle received signal from the mobile device 201 has at least a minimum signal-to-noise ratio or other indicator of received signal strength. For example, when the network interface 213 of the vehicle 100 detects a Bluetooth beacon sent from the mobile device 201. As part of the process of step 400, the mobile device 201 may send an indicator associated with the mobile device 201. For example, the vehicle application 202 may send a digital certificate, a voiceprint, a face print (taken by a camera), a unique number, a unique code, and/or other credential that identifies the mobile device 201 and/or user of the mobile device 201.

In one embodiment, the vehicle management module 216 determines, in step 402, whether the identifier is valid. For example, the vehicle management module 216 may compare the identifier received in step 400 to a vehicle stored identifier to see if the user of the mobile device 201 can access the vehicle 100. If the identifier is not valid in step 402 (as the received identifier does not match the identifier stored in the vehicle), the process ends. Otherwise, if the identifier is valid in step 402 (as the received identifier matches the identifier stored in the vehicle), the vehicle management module 216 may optionally send a message/command to activate one or more vehicle sensors 212 in step 404. For example, the vehicle management module 216 may send a message to activate a group of cameras located around the vehicle 100 and to enable a microphone array located on the vehicle 100. One purpose of sending the message/command to active the vehicle sensors 212 in step 404 is to conserve power. If the vehicles sensors 212 are continually running, batteries for the vehicle 100 may become discharged. In this case, the vehicle sensors 212 are only active when the mobile device 201 has come in spatial proximity to the vehicle 100, thus conserving battery power. However, in one embodiment, the message of step 404 is not sent because the vehicle sensors 212 are already active. The message to activate the one or more vehicle sensors 212 of step 404 can be accomplished in various ways. For example, the vehicle management module 216 may send a command to a microcontroller in a digital camera. Alternatively, the vehicle management module 216 may program an output device to enable a relay to activate a sensor.

The vehicle sensors 212 sends collected sensor information to the vehicle management module 216 in step 406. The vehicle management module 216 processes the sensor information in step 408. The vehicle management module 216 may process the sensor information to determine various actions to be performed in the vehicle 100. For example, the vehicle management module 216 may digitally process the sensor information to determine a gesture made by a person approaching the vehicle 100, determine an identity of the person approaching the vehicle 100, determine a verbal command made by the person in proximity to the vehicle 100, compare a voiceprint of a person approaching the vehicle 100 to a stored voiceprint of the person, determine if the person is carrying an object (e.g., a bag of groceries), determine a distance the person is from the vehicle 100 (e.g., to know when to turn on a lighting system), determining a type of clothing worn by the person (e.g., to determine whether conditions/temperature), determine a walking pattern of the person (e.g., to see if the person might be intoxicated), determine specific items and/or sizes of items being carried by the person (e.g., to determine if the trunk of the vehicle 100 needs to be opened), determine a weather condition around the vehicle 100 (e.g., to see if it is sunny, raining, snowing, etc.) determine a time of day when the mobile device 201 is in proximity to the vehicle 100 (e.g., at night versus in the day), determine a temperature when the mobile device is in proximity to the vehicle 100, determine a number of persons approaching the vehicle 100, determine identities of the number of persons approaching the vehicle 100, determining a spatial location of the vehicle 100, determine other persons located around the vehicle 100 (e.g., a robber), determine other vehicles 100 located around the vehicle 100 (e.g., using a vehicle profile to identify specific types of vehicles), and/or the like.

The vehicle management module 216 uses the rules/user preferences 215, in step 408, to identify actions to be performed or features or settings to be implemented in the vehicle 100 based on the sensor information received in step 406. For example, a specific gesture may cause a specific action to be implemented in the vehicle 100, such as controlling a lighting system, controlling a locking system, starting the vehicle 100, and/or the like; a determined identity of the person approaching the vehicle 100 may cause the vehicle to authenticate successfully the person before enabling access to the vehicle interior, a determined verbal command made by the person in proximity to the vehicle 100 may cause the vehicle to execute the command, a successful match of a received voiceprint of a person approaching the vehicle 100 to a stored voiceprint of the person may cause the vehicle to authenticate successfully the person before enabling access to the vehicle interior, a determination that the person is carrying an object (e.g., a bag of groceries) may cause the vehicle to open the vehicle trunk or other cargo area, a determined distance the person is from the vehicle 100 may cause the vehicle to activate a vehicle lighting system when the illumination is most helpful to the person, determining a type of clothing worn by the person may cause the vehicle to preset HVAC settings within the vehicle before the person sends a command to the vehicle, a determined walking pattern of the person may cause the vehicle to deactivate manual driving mode in favor of an autonomous driving mode, the determined specific items and/or sizes of items being carried by the person may cause the vehicle enable access to a cargo area of the vehicle 100, a determined weather condition around the vehicle 100 may cause the vehicle to preset HVAC settings or enable access to the vehicle interior, a determined time of day when the mobile device 201 is in proximity to the vehicle 100 may cause the vehicle to activate vehicle lighting to provide illumination for the person, a determined temperature when the mobile device is in proximity to the vehicle 100 may cause the vehicle to preset HVAC settings or enable access to the vehicle interior, a determined number of persons approaching the vehicle 100 may cause the vehicle to enable access to the vehicle by means of plural doors, determined identities of the number of persons approaching the vehicle 100 may cause the vehicle to activate settings in the vehicle as set forth in stored profiles for the identified persons, determining a spatial location of the vehicle 100 may cause the vehicle to enable some doors and disable other doors due to oncoming traffic, determining other persons located around the vehicle 100 may cause the vehicle to deny or block access to the vehicle interior, and determining other vehicles 100 located around the vehicle 100 may cause the vehicle to take evasive action or deny ingress to egress into or from the vehicle for the safety of occupants.

Based on the determined action(s), the vehicle management module 216 send one or more commands to implement the action(s) to the vehicles subsystem(s) 211 in step 410. The vehicle subsystem(s) 211 then implement the command(s). The command may be sent in various ways. For example, the vehicle management module 216 may send a message to a radio to have the radio to tune into a specific radio station. Alternatively, the vehicle management module 216 may send a message to a microcontroller that controls a window-heating element based a determination that the temperature is below zero.

To illustrate consider the following example. The vehicle management module 216 determines that the mobile device 201 of the user Joe is in spatial proximity to the vehicle 100 by detecting a Bluetooth beacon in step 400. The vehicle application 202 sends a digital certificate and an identifier of the mobile device 201 (such as a mobile identification number or mobile subscription identification number or other mobile device identifier) that is verified to be valid with the vehicle 100 by the vehicle management module 216 in step 402. In response, the vehicle management module 216 sends a message to an array of cameras located around the vehicle 100, in step 404, to activate the camera array. The vehicle management module 216 also sends a message to activate a temperature sensor in the vehicle 100 in step 404.

The array of cameras captures an image that Joe is approaching the vehicle 100 and that Joe is accompanied by his friend Sally. This information is sent to the vehicle management module 216 in step 406. The temperature sensor also sends the temperature information in step 406 to the vehicle management module 216. The vehicle management module 216 determines the identities of Joe and Sally based on stored facial profiles (in the rules/user preferences 215) in step 408. The vehicle management module 216 also determines, based on the image and a temperature reading that there is snow located around the vehicle 100 and the temperature is below zero. The use of multiple factors can enable multi-factor authentication, which is a method of computer access control in which a user is granted access only after successfully presenting several separate pieces of evidence to an authentication mechanism.

The rules/user preferences 215 define that Joe is authorized to drive the vehicle 100 and that Sally is a known (learned) passenger of Joe's is not authorized to drive the vehicle 100. The rules/user preferences 215 define to unlock the driver's door when Joe is within twenty feet of the vehicle 100. The rules/preferences 215 also defines that if a second passenger is present, to unlock the passenger's door. In addition, the rules/preferences 215 also define a rule to enable window/seat heating when the temperature is below 40 degrees. The rules/preferences 215 also define a rule to enable four-wheel drive when snow is present.

Based on the defined rules/preferences, the vehicle management module 216 sends commands, in step 410 to unlock the driver's and passenger's side doors, turns on the window/seat heating systems (for Joe's seat, to Joe's defined heat seating preferences), and automatically turns on 4-wheel drive for the vehicle 100. If Sally sits in the driver's seat, the system does not let Sally drive the vehicle 100 because Sally is not authorized to drive the vehicle 100.

FIG. 5 is a flow diagram of a process for managing a vehicle access/control system controlled by a cloud system 301. The process starts in step 500 when the mobile device 201 comes within proximity of the vehicle 100. For example, when a Bluetooth signal is detected between the mobile device 201 and the vehicle 100. In a first embodiment, the vehicle management module 216 detects, in step 502, that the mobile device 201 has come into proximity with the vehicle 100. The process of step 502 may be similar to step 402 in FIG. 4. In response to the detection of proximity by the vehicle management module 216, the vehicle management module 216 may send a message to the cloud vehicle management module 302, in step 508, that the mobile device 201 is in proximity to the vehicle 100.

In a second embodiment, in step 504, the mobile device 201 (via the vehicle application 202) may detect that the mobile device 201 is in proximity to the vehicle 100. The mobile device 201 (via the vehicle application 202) may send a message to the cloud vehicle management module 302, in step 506, that the mobile device 201 is in proximity to the vehicle 100. Normally only one message 506 or 508 is sent to the cloud vehicle management module 302. However, this is not limiting. For example, both the mobile device 201 and the vehicle management module 216 can send the detection messages 506/508.

Upon receiving one or both of the detection messages 506/508, the cloud vehicle management module 302 sends, in step 510, a message to the vehicle management module 216 to activate one or more vehicle sensors 212. The message of step 510 may be based on the rules/user preferences 303. For example, the rules/user preferences 303 may define specific vehicle sensors 212 that may be used to determine specific actions to take. The specific vehicle sensors 212 may vary based on which vehicle sensors 212 are in the vehicle 100. For example, a first vehicle 100 may have an array of cameras, a microphone, and a temperature sensor. A second vehicle 100 may only have the array of cameras; thus the activate sensors message of step 510 may be limited based on the specific vehicle sensors 212 supported in the vehicle 100.

In one embodiment, when the vehicle 100 initially connects to the cloud vehicle management module 302, the vehicle 100 sends a list of what vehicle sensors 212 the vehicle 100 supports. Based on the list of vehicle sensors 212, the cloud vehicle management module 302 can determine, based on the rules/user preferences 303, which sensors to activate in step 510 according to the rules/user preferences 303.

In response to receiving the message to activate the one or more vehicle sensors 212 in step 510, the vehicle management module 216 activates the one or more vehicle sensors 212 in step 512. The one or more vehicle sensors 212 sends their respective sensor information, in step 514, to the vehicle management module 216. In one embodiment, the sensor information of step 514 is passed directly to the cloud vehicle management module 302 without any processing/filtering in step 518. In this embodiment, the rules/user preferences 215 would not be used or necessary.

In another embodiment, the vehicle management module 216 may process, in step 516, some or all of the sensor information received in step 514. Processing the sensor information in step 516 may comprise filtering, modifying, and/or changing the sensor information received in step 514. For example, the vehicle management module 216 may filter out background images of a video stream to only capture the faces of persons who are approaching and/or are around the vehicle 100. In this example, only images of the faces are sent to the cloud vehicle management module 302 in step 518. The vehicle management module 216 may identify specific gestures made by one or more persons and send an identifier identifying the gesture in step 518. The vehicle management module 216 may filter/modify voice information. For example, the vehicle management module 216 may convert voice of a person approaching or around the vehicle 100 to text that is sent in step 518. The vehicle management module 216 may identify specific speakers associated with specific text or voice in step 516. The vehicle management module 216 may identify a specific whether condition (e.g., it is snowing) in step 516 and send an identifier indicating it is snowing in step 518 to the cloud vehicle management module 302. Likewise, objects/vehicles 100 around the vehicle 100 or carried items may be identified by the vehicle management module 216. The vehicle management module 216 may the send identifiers indicating the types of objects/vehicles 100. The filtering/processing of step 516 may be based on the rules/user preferences 215.

The cloud vehicle management module 302 receives the vehicle sensor information in step 518. The cloud vehicle management module 302 processes the received vehicle sensor information (e.g., like the examples discussed in FIG. 4, step 408) in step 520 according the rules/user preferences 303. Based on the rules/user preferences 303 the cloud vehicle management module 302 sends a message to implement one or more actions, in step 522, to the vehicle management module 216. The vehicle management module 216 the sends a message/command, in step 524, to the vehicle subsystem(s) 211 to implement the one or more actions (e.g., as discussed in FIG. 4). The vehicle management module 216 the sends a message to the cloud vehicle management module 302 that the actions have been implemented in step 526.

FIG. 6 is a flow diagram of a process for managing a vehicle access/control system with shared control between a vehicle 100 and a cloud system 301. The process starts in step 600 when the mobile device 201 comes within proximity of the vehicle 100. For example, when a Bluetooth signal is detected between the mobile device 201 and the vehicle 100. In a first embodiment, the vehicle management module 216 detects, in step 602, that the mobile device 201 has come into proximity with the vehicle 100. The process of step 602 may be similar to step 402 in FIG. 4. In response to the detection of proximity by the vehicle management module 216, the vehicle management module 216 may send a message to the cloud vehicle management module 302, in step 608, that the mobile device 201 is in proximity to the vehicle 100.

In a second embodiment, in step 604, the mobile device 201 (via the vehicle application 202) may detect that the mobile device 201 is in proximity to the vehicle 100. The mobile device 201 (via the vehicle application 202) may send a message to the cloud vehicle management module 302, in step 606, that the mobile device 201 is in proximity to the vehicle 100. Normally only one message 606 or 608 is sent to the cloud vehicle management module 302. However, this is not limiting. For example, both the mobile device 201 and the vehicle management module 216 can send the detection messages 606/608.

Upon receiving one or both of the detection messages 606/608, the cloud vehicle management module 302 sends, in step 610, a message to the vehicle management module 216 to activate one or more vehicle sensors 212. The message of step 610 may be based on the rules/user preferences 303. For example, the rules/user preferences 303 may define specific vehicle sensors 212 that may be used to determine specific actions to take.

In one embodiment, the message of 610 is not a message to activate a vehicle sensor 212. Instead, the message of step 610 may be a message to start the process of determining actions based on sensor information. In this example, the specific vehicle sensors 212 to activate may be stored in the rules/user preferences 215, which the vehicle management module 216 uses to initiate the process of steps 612-620. In this embodiment, the activate sensors message of step 612 may be optional because the vehicle sensors 212 are already active.

In response to receiving the message to activate the one or more vehicle sensors 212 in step 610, the vehicle management module 216 activates the one or more vehicle sensors 212 in step 612. This may be accomplished by sending a message, setting a bit on a port in a microcontroller, and/or the like. The one or more vehicle sensors 212 sends their respective sensor information, in step 614, to the vehicle management module 216. The vehicle management module 216 processes the sensor information in step 408 (e.g., like discussed in FIG. 4, step 408). The vehicle management module 216 may process the sensor information to determine various actions to be performed in the vehicle 100. The vehicle management module 216 uses the rules/user preferences 215, in step 616, to identify actions to be performed in the vehicle 100 based on the sensor information received in step 614. For example, a specific gesture may cause a specific action to be implemented in the vehicle 100, such as controlling a dashboard system, controlling a sound system, disabling the vehicle 100 from being driven, and/or the like.

Based on the determined action(s), the vehicle management module 216 sends one or more commands to implement the action(s) to the vehicles subsystem(s) 211 in step 618. The vehicle subsystem(s) 211 then implement the command(s). The command(s) may be sent in various ways. For example, in any of the manners discussed above. The vehicle management module 216 then sends a message to the cloud vehicle management module 302 that the actions have been implemented in step 620.

The examples discussed in FIG. 4 can all apply to the cloud based system described in FIGS. 5-6. In addition, the rules/user preferences 215/303 described above may apply to each of the FIGS. 4-6. The rules/user preferences 215/303 may contain rules that are based on information received from the mobile device 201. For example, the rules/user preferences 215/303 may also be based on one or more factors, such as a person shaking the mobile device 201 a specified number of times and/or in a specific spatial pattern, the person tapping the mobile device 201 a specified number of times and/or in a specific spatial pattern, the person providing a matching fingerprint on the mobile device 201, the person providing a matching voiceprint on the mobile device 201, receiving a matching picture of the person from a camera on the mobile device 201, determining a content of a calendar of the person (e.g., based on an event in the calendar a specific vehicle action is performed or used in conjunction with another event), analyzing a posting on a social media site of the person, analyzing a received heart rate of the person taken on the mobile device 201, and/or the like. The mobile device 201 can provide a signal to the vehicle affirming that each received factor matches a corresponding value stored in the mobile device 201 that causes the vehicle to perform an associated vehicle action, a signal to the vehicle affirming that each received factor matches a corresponding value stored in the mobile device 201 and forwarding a command to the vehicle to perform an associated vehicle action, or forwarding the value of the received factor itself to the vehicle to compare against stored values and, if matching vehicle stored values, performing the associated vehicle action.

The rules/user preferences 215/303 may require a multi-level authentication before any action takes place. For example, as part of the proximity detection in steps 402, 502, and 602, in addition to sending the digital certificate, the rules/user preferences 215/303 may also require that the facial recognition be determined based on the received sensor information before access is granted to the vehicle 100.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a system for providing fail operational power comprising: a vehicle control unit that receives feedback from an intelligent voltage/current sensor and a DC/DC controller, wherein the DC/DC controller comprises a first switch for controlling power from a primary power source, processes the feedback from the intelligent voltage/current sensor and/or the DC/DC controller to determine a failure in the primary power source, and in response to determining the failure in the primary power source, provides a signal for switching a second switch that disables the power from the primary power source.

Aspects of the above include a system, comprising a microprocessor; and a computer readable medium, coupled with the microprocessor and comprising microprocessor readable and executable instructions that program the microprocessor to: receive a message that a mobile device is in proximity to a vehicle; receive information from one or more sensors on the vehicle in response to the mobile device being in proximity to the vehicle; process the received information from the one or more sensors on the vehicle to identify one or more actions to implement on the vehicle; and send one or more commands to implement one or more actions on the vehicle.

Aspects of the above include a system, wherein the microprocessor is in the vehicle, wherein the message that the mobile device is in proximity to the vehicle is also received at a cloud system, wherein the cloud system sends a message to the vehicle to activate the one or more sensors in the vehicle so that the vehicle can receive the information from the one or more sensors to identify the one or more actions to implement on the vehicle.

Aspects of the above include a system, wherein the microprocessor is in the vehicle and wherein the microprocessor activates the one or more sensors in the vehicle in response to receiving the message that the mobile device is in proximity to the vehicle.

Aspects of the above include a system, wherein the microprocessor is in a cloud system on a network, wherein the received message is received from the mobile device and wherein the cloud system sends a message to the vehicle to activate the one or more sensors in the vehicle in response to receiving the message that the mobile device is in proximity to the vehicle.

Aspects of the above include a system, wherein the microprocessor receives a message from the vehicle that the one or more actions have been implemented on the vehicle.

Aspects of the above include a system, wherein the processed received information from the one or more sensors is filtered in the vehicle before being received.

Aspects of the above include a system, wherein the microprocessor is in a cloud system on a network, wherein the received message is received from the vehicle and wherein the cloud system sends a message to the vehicle to activate the one or more sensors in the vehicle in response to receiving the message that the mobile device is in proximity to the vehicle.

Aspects of the above include a system, wherein the one or more actions comprises at least one of: unlocking a specific door, unlocking a trunk door, setting a seat heating level of a specific seat in the vehicle, setting an air conditioning/heating level for a specific location in the vehicle, setting off an alarm, locking the vehicle, disabling driving of the vehicle, disabling manual driving control of the vehicle, opening two or more specific doors on the vehicle, adjusting a seat in the vehicle, selecting a specific radio station, selecting a specific song track to play, suggesting a specific driving route, adjusting a height of a steering wheel, enabling/disabling windshield wipers, enabling a window heating element, adjusting a tint level in a window, folding up or down a seat, enabling/disabling four wheel drive, activating an automatic driving mode, activating a biometric scanner in the vehicle, turning on a lighting system in the vehicle, activating a telephone in the vehicle, locking one or more doors, and starting the vehicle.

Aspects of the above include a system, wherein processing the received information from the one or more sensors on the vehicle comprises: determining a gesture made by a person; determining an identity of the person; determining a verbal command made by the person; comparing a voice print of the person; determining if the person is carrying an object; determining a distance the person is from the vehicle; determining a type of clothing worn by the person; determining a walking pattern of the person; determining a specific item being carried by the person; determining a voice pattern of the person (e.g., is the person's voice slurred); determining a weather condition around the vehicle; determining a time of day the mobile device is in proximity to the vehicle; determining a temperature when the mobile device is in proximity to the vehicle; determining a number of persons approaching the vehicle; determining identities of the number of persons approaching the vehicle; determining a location of the vehicle; determining another person located around the vehicle; and determining another vehicle located around the vehicle.

Aspects of the above include a system, wherein implementing the one or more actions on the vehicle is based on one or more rules, wherein the one or more rules are also based on at least one of the following: a person shaking the mobile device, the person tapping the mobile device, the person providing a fingerprint on the mobile device, the person providing a voice print on the mobile device, receiving a picture of the person from a camera on the mobile device, a calendar of the person, a posting on a social media site of the person, and a received heart rate of the person taken by the mobile device.

Embodiments include a method for: receiving, by a microprocessor, a message that a mobile device is in proximity to a vehicle; receiving, by the microprocessor, information from one or more sensors on the vehicle in response to the mobile device being in proximity to the vehicle; processing, by the microprocessor, the received information from the one or more sensors on the vehicle to identify one or more actions to implement on the vehicle; and sending, by the microprocessor, one or more commands to implement one or more actions on the vehicle.

Aspects of the above include a method, wherein the microprocessor is in the vehicle, wherein the message that the mobile device is in proximity to the vehicle is also received at a cloud system, wherein the cloud system sends a message to the vehicle to activate the one or more sensors in the vehicle so that the vehicle can receive the information from the one or more sensors to identify the one or more actions to implement on the vehicle.

Aspects of the above include a method, wherein the microprocessor is in the vehicle and wherein the microprocessor activates the one or more sensors in the vehicle in response to receiving the message that the mobile device is in proximity to the vehicle.

Aspects of the above include a method, wherein the microprocessor is in a cloud system on a network, wherein the received message is received from the mobile device and wherein the cloud system sends a message to the vehicle to activate the one or more sensors in the vehicle in response to receiving the message that the mobile device is in proximity to the vehicle.

Aspects of the above include a method, wherein the microprocessor receives a message from the vehicle that the one or more actions have been implemented on the vehicle.

Aspects of the above include a method, wherein the processed received information from the one or more sensors is filtered in the vehicle before being received.

Aspects of the above include a method, wherein the microprocessor is in a cloud system on a network, wherein the received message is received from the vehicle and wherein the cloud system sends a message to the vehicle to activate the one or more sensors in the vehicle in response to receiving the message that the mobile device is in proximity to the vehicle.

Aspects of the above include a method, wherein the one or more actions comprises at least one of: unlocking a specific door, unlocking a trunk door, setting a seat heating level of a specific seat in the vehicle, setting an air conditioning/heating level for a specific location in the vehicle, setting off an alarm, locking the vehicle, disabling driving of the vehicle, disabling manual driving control of the vehicle, opening two or more specific doors on the vehicle, adjusting a seat in the vehicle, selecting a specific radio station, selecting a specific song track to play, suggesting a specific driving route, adjusting a height of a steering wheel, enabling/disabling windshield wipers, enabling a window heating element, adjusting a tint level in a window, folding up or down a seat, enabling/disabling four wheel drive, activating an automatic driving mode, activating a biometric scanner in the vehicle, turning on a lighting system in the vehicle, activating a telephone in the vehicle, locking one or more doors, and starting the vehicle.

Aspects of the above include a method, wherein processing the received information from the one or more sensors on the vehicle comprises: determining a gesture made by a person; determining an identity of the person; determining a verbal command made by the person; comparing a voice print of the person; determining if the person is carrying an object; determining a distance the person is from the vehicle; determining a type of clothing worn by the person; determining a walking pattern of the person; determining a specific item being carried by the person; determining a voice pattern of the person; determining a weather condition around the vehicle; determining a time of day the mobile device is in proximity to the vehicle; determining a temperature when the mobile device is in proximity to the vehicle; determining a number of persons approaching the vehicle; determining identities of the number of persons approaching the vehicle; determining a location of the vehicle; determining another person located around the vehicle; and determining another vehicle located around the vehicle.

Aspects of the above include a method, wherein implementing the one or more actions on the vehicle is based on one or more rules, wherein the one or more rules are also based on at least one of the following: a person shaking the mobile device, the person tapping the mobile device, the person providing a fingerprint on the mobile device, the person providing a voice print on the mobile device, receiving a picture of the person from a camera on the mobile device, a calendar of the person, a posting on a social media site of the person, and a received heart rate of the person taken by the mobile device.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by, or in connection with, an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric automated vehicle" (EV), also referred to herein as an electric drive automated vehicle, may use one or more electric motors or traction motors for propulsion. An electric automated vehicle may be powered through a collector system by electricity from off-automated vehicle sources, or may be self-contained with a battery or generator to convert fuel to electricity. An electric automated vehicle generally includes a rechargeable electricity storage system (RESS) (also called Full Electric Automated vehicles (FEV)). Power storage methods may include: chemical energy stored on the automated vehicle in on-board batteries (e.g., battery electric automated vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric automated vehicle" refers to an automated vehicle that may combine a conventional (usually fossil fuel-powered) powertrain with some form of electric propulsion. Most hybrid electric automated vehicles combine a conventional internal combustion engine (ICE) propulsion system with an electric propulsion system (hybrid automated vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is an automated vehicle that can run on just the engine, just the batteries, or a combination of both. A mid hybrid is an automated vehicle that cannot be driven solely on its electric motor, because the electric motor does not have enough power to propel the vehicle on its own.

The term "rechargeable electric automated vehicle" or "REV" refers to an automated vehicle with on board rechargeable energy storage, including electric automated vehicles and hybrid electric automated vehicles.

What is claimed is:

1. A system comprising:
a microprocessor; and
a computer readable medium, coupled with the microprocessor and comprising microprocessor readable and executable instructions that program the microprocessor to:
receive a message that a mobile device is in proximity to a vehicle;
in response to receiving the message, access information from one or more sensors on the vehicle in response to the mobile device being in proximity to the vehicle;
process the received information from the one or more sensors on the vehicle to identify one or more actions to implement on the vehicle, comprising:
determining that a specific gesture is made by a person approaching the vehicle;
determining a type of clothing worn by the person;
determining a weather condition around the vehicle; and
determining the one or more actions that correspond to at least one of the specific gesture made by the person, the type of clothing worn by the person, and the weather condition around the vehicle, wherein the one or more actions comprise at least one of unlocking a specific door of the vehicle, adjusting a seat and steering wheel of the vehicle, and adjusting a heating ventilation and air conditioning (HVAC) setting of the vehicle; and
send one or more commands to implement the one or more actions on the vehicle.

2. The system of claim 1, wherein the microprocessor is in the vehicle, wherein the message that the mobile device is in proximity to the vehicle is also received at a cloud system, wherein the cloud system sends a message to the vehicle to activate the one or more sensors in the vehicle, and wherein the vehicle receives the information from the one or more sensors to identify the one or more actions to implement on the vehicle.

3. The system of claim 1, wherein the microprocessor is in the vehicle and wherein the microprocessor activates the one or more sensors in the vehicle in response to receiving the message that the mobile device is in proximity to the vehicle.

4. The system of claim 1, wherein the microprocessor is in a cloud system on a network, wherein the received message is received from the mobile device, and wherein the cloud system sends a message to the vehicle to activate the one or more sensors in the vehicle in response to receiving the message that the mobile device is in proximity to the vehicle.

5. The system of claim 4, wherein the microprocessor receives a message from the vehicle that the one or more actions have been implemented on the vehicle.

6. The system of claim 4, wherein the processed received information from the one or more sensors is filtered in the vehicle before being received.

7. The system of claim 1, wherein the microprocessor is in a cloud system on a network, wherein the received message is received from the vehicle, and wherein the cloud system sends a message to the vehicle to activate the one or more sensors in the vehicle in response to receiving the message that the mobile device is in proximity to the vehicle.

8. The system of claim 1, wherein the one or more actions further comprise at least one of: setting an HVAC level for a specific location in the vehicle, warning the person that an unknown person is in the vehicle, warning the person that the unknown person is hiding behind the vehicle, selecting a specific radio station, selecting a specific song track to play, suggesting a specific driving route, adjusting a height of a steering wheel, enabling/disabling windshield wipers, adjusting a tint level in a window, folding up or down a seat, enabling/disabling four wheel drive, and activating an automatic driving mode for the vehicle.

9. The system of claim 1, wherein implementing the one or more actions on the vehicle is based on one or more rules, wherein the one or more rules are also based on at least one of the following: a person shaking the mobile device, the person tapping the mobile device, the person providing a fingerprint on the mobile device, the person providing a voice print on the mobile device, receiving a picture of the person from a camera on the mobile device, determining a content of a calendar of the person, analyzing a posting on a social media site of the person, and analyzing a received heart rate of the person taken by the mobile device.

10. The system of claim 1, wherein processing the received information from the one or more sensors on the vehicle further comprises determining a size of an item being carried by the person, and wherein the one or more actions further comprise opening a trunk of the vehicle.

11. A method comprising:
receiving, by a microprocessor, a message that a mobile device is in proximity to a vehicle;
in response to receiving the message, receiving, by the microprocessor, information from one or more sensors on the vehicle in response to the mobile device being in proximity to the vehicle;
processing, by the microprocessor, the received information from the one or more sensors on the vehicle to identify one or more actions to implement on the vehicle, comprising:
determining that a specific gesture is made by a person approaching the vehicle;
determining a type of clothing worn by the person,
determining a weather condition around the vehicle; and
determining the one or more actions that correspond to at least one of the specific gesture made by the person, they type of clothing worn by the person, and the weather condition around the vehicle, wherein the one or more actions comprise at least one of unlocking a specific door of the vehicle, adjusting a seat and steering wheel of the vehicle, and adjusting a heating ventilation and air conditioning (HVAC) setting the vehicle; and
sending, by the microprocessor, one or more commands to implement the one or more actions on the vehicle.

12. The method of claim 11, wherein the microprocessor is in the vehicle, wherein the message that the mobile device is in proximity to the vehicle is also received at a cloud system, wherein the cloud system sends a message to the vehicle to activate the one or more sensors in the vehicle, and wherein the vehicle receives the information from the one or more sensors to identify the one or more actions to implement on the vehicle.

13. The method of claim 11, wherein the microprocessor is in the vehicle and wherein the microprocessor activates the one or more sensors in the vehicle in response to receiving the message that the mobile device is in proximity to the vehicle.

14. The method of claim 11, wherein the microprocessor is in a cloud system on a network, wherein the received message is received from the mobile device, and wherein the cloud system sends a message to the vehicle to activate the one or more sensors in the vehicle in response to receiving the message that the mobile device is in proximity to the vehicle.

15. The method of claim 14, wherein the microprocessor receives a message from the vehicle that the one or more actions have been implemented on the vehicle.

16. The method of claim 14, wherein the processed received information from the one or more sensors is filtered in the vehicle before being received.

17. The method of claim 11, wherein the microprocessor is in a cloud system on a network, wherein the received message is received from the vehicle, and wherein the cloud system sends a message to the vehicle to activate the one or more sensors in the vehicle in response to receiving the message that the mobile device is in proximity to the vehicle.

18. The method of claim 11, wherein the one or more actions further comprise at least one of: setting an HVAC level for a specific location in the vehicle, warning the person that an unknown person is in the vehicle, warning the person that the unknown person is hiding behind the vehicle, selecting a specific radio station, selecting a specific song track to play, suggesting a specific driving route, adjusting a height of a steering wheel, enabling/disabling windshield wipers, adjusting a tint level in a window, folding up or down a seat, enabling/disabling four wheel drive, and activating an automatic driving mode for the vehicle.

19. The method of claim 11, wherein implementing the one or more actions on the vehicle is based on one or more rules, wherein the one or more rules are also based on at least one of the following: a person shaking the mobile device, the person tapping the mobile device, the person providing a fingerprint on the mobile device, the person providing a voice print on the mobile device, receiving a picture of the person from a camera on the mobile device, determining a content of a calendar of the person, analyzing a posting on a social media site of the person, and analyzing a received heart rate of the person taken by the mobile device.

20. The method of claim 11, wherein processing the received information from the one or more sensors on the vehicle further comprises determining a size of an item being carried by the person, and wherein the one or more actions further comprise opening a trunk of the vehicle.

* * * * *

UNITED STATES PATENT AND TRADEMARK OFFICE
CERTIFICATE OF CORRECTION

PATENT NO. : 10,717,412 B2
APPLICATION NO. : 15/810746
DATED : July 21, 2020
INVENTOR(S) : Infantdani Abel Rayan et al.

Page 1 of 1

It is certified that error appears in the above-identified patent and that said Letters Patent is hereby corrected as shown below:

In the Claims

Claim 11, Column 21, Line 37, delete the "," and insert a --;-- therein.
Claim 11, Column 21, Line 42, delete "they" and insert --the-- therein.

Signed and Sealed this
First Day of September, 2020

Andrei Iancu
*Director of the United States Patent and Trademark Office*